United States Patent
Bromand et al.

(10) Patent No.: US 10,803,864 B2
(45) Date of Patent: Oct. 13, 2020

(54) VOICE RECOGNITION SYSTEM FOR USE WITH A PERSONAL MEDIA STREAMING APPLIANCE

(71) Applicant: Spotify AB, Stockholm (SE)

(72) Inventors: Daniel Bromand, Stockholm (SE); Richard Mitic, Stockholm (SE); Horia Jurcut, Hagersten (SE); Jennifer Thom-Santelli, Medford, MA (US); Henriette Cramer, San Francisco, CA (US); Karl Humphreys, London (GB); Robert Williams, Arlington, MA (US); Kurt Jacobson, Stoneham, MA (US); Henrik Lindström, Stockholm (SE)

(73) Assignee: SPOTIFY AB, Stockholm (SE)

( * ) Notice: Subject to any disclaimer, the term of this patent is extended or adjusted under 35 U.S.C. 154(b) by 214 days.

(21) Appl. No.: 15/973,215

(22) Filed: May 7, 2018

(65) Prior Publication Data
US 2019/0341037 A1    Nov. 7, 2019

(51) Int. Cl.
*G10L 15/00* (2013.01)
*G10L 15/22* (2006.01)
*G10L 15/26* (2006.01)

(52) U.S. Cl.
CPC .............. *G10L 15/22* (2013.01); *G10L 15/26* (2013.01); *G10L 2015/223* (2013.01)

(58) Field of Classification Search
CPC ... G10L 15/22; G10L 2015/223; G10L 15/26; G10L 15/265; G10L 15/30; G10L 15/08; G10L 15/00; G10L 17/005; G06F 3/167; G06F 3/0482; G06F 3/16
See application file for complete search history.

(56) References Cited

U.S. PATENT DOCUMENTS

| | | | | |
|---|---|---|---|---|
| 9,484,030 B1* | 11/2016 | Meaney | ................... | G10L 15/22 |
| 9,826,306 B2* | 11/2017 | Lang | .................... | H04R 27/00 |
| 2012/0163603 A1* | 6/2012 | Abe | ................... | H04W 12/1206 380/278 |
| 2013/0024018 A1* | 1/2013 | Chang | .................... | G08C 17/02 700/94 |
| 2014/0064501 A1* | 3/2014 | Olsen | ........................ | H04S 7/40 381/58 |
| 2014/0244013 A1* | 8/2014 | Reilly | .............. | H04N 21/43615 700/94 |

(Continued)

FOREIGN PATENT DOCUMENTS

| | | |
|---|---|---|
| WO | 01/22249 A1 | 3/2001 |
| WO | 2017/147081 A1 | 8/2017 |

OTHER PUBLICATIONS

Extended European Search Report issued in European Application No. 19172878.1, dated Sep. 20, 2019.

(Continued)

*Primary Examiner* — Edgar X Guerra-Erazo
(74) *Attorney, Agent, or Firm* — Merchant & Gould P.C.

(57) ABSTRACT

A system and method for voice control of a media playback device is disclosed. The method includes receiving an instruction of a voice command, converting the voice command to text, transmitting the text command to the playback device, and having the playback device execute the command. An instruction may include a command to play a set of audio tracks, and the media playback device plays the set of audio tracks upon receiving the instruction.

13 Claims, 13 Drawing Sheets

(56) References Cited

U.S. PATENT DOCUMENTS

| | | | |
|---|---|---|---|
| 2015/0010169 A1* | 1/2015 | Popova | H03G 3/20 |
| | | | 381/107 |
| 2015/0104037 A1* | 4/2015 | Lee | H04R 3/12 |
| | | | 381/80 |
| 2015/0189438 A1* | 7/2015 | Hampiholi | G06F 3/165 |
| | | | 381/80 |
| 2015/0222987 A1* | 8/2015 | Angel, Jr. | G06F 16/639 |
| | | | 381/80 |
| 2016/0118048 A1 | 4/2016 | Heide | |
| 2016/0353218 A1* | 12/2016 | Starobin | G06F 3/167 |
| 2017/0242653 A1* | 8/2017 | Lang | H04R 3/00 |
| 2018/0018967 A1 | 1/2018 | Lang et al. | |
| 2018/0240461 A1 | 8/2018 | Jung | |
| 2019/0103103 A1 | 4/2019 | Ni et al. | |

OTHER PUBLICATIONS

Summons to Attend Oral Proceedings issued in corresponding European Application No. 19172878.1, dated Jul. 28, 2020.

\* cited by examiner

VOICE RECOGNITION SYSTEM FOR USE WITH A PERSONAL MEDIA STREAMING APPLIANCE

BACKGROUND

Many people enjoy consuming media content while traveling or during other activities. For example, many drivers and passengers listen to audio content, such as songs, albums, podcasts, audiobooks, and other types of audible content, while traveling in vehicles. Typical sources of such audio content in vehicles include radios and fixed media, such as CDs, USBs, and SD cards. Media content from such typical sources are not flexible or personalized for the listeners in vehicles. However, these media are not flexible or customized to the listeners. Some cars are equipped with built-in streaming audio systems, but limited user interfaces can make such systems difficult to use. A few recent car models have more advanced entertainment systems, but have yet to be widely used.

When a user selects a preset button on a media playback device, the media playback device operates to play back a particular audio content assigned to the selected preset button. Typically, information about the audio content for the preset button is locally stored in the media playback device. Therefore, the user cannot edit the preset button with another audio content. Further, when the software and/or firmware of the media content device are updated, there is a risk of breaking the compatibility of the preset buttons with other audio output systems (e.g., Bluetooth® speakers or car audio systems) connected to the media playback device. Because the preset button on the media playback device is locally stored and not editable, the user has no option to share the preset content across other media playback devices.

Using a mobile phone or other media-playback device, such as a vehicle-integrated media playback device, a person can access large catalogs of media content. For example, a user can access an almost limitless catalog of media content through various free and subscription-based streaming services. Additionally, a user can store a large catalog of media content on his or her mobile device.

This nearly limitless access to media content introduces new challenges for users. For example, it may be difficult to find or select desired media content or media content that complements a particular moment while traveling.

SUMMARY

In general terms, the present disclosure is directed to a system and method for voice control of preset buttons or software functions of a media playback device. Various aspects are described in this disclosure, which include, but are not limited to, the following aspects.

One aspect is a method for playing a media content item via a voice command. The method comprises obtaining an audio clip of an instruction representative of a preset command from a media playback device, the preset command having preset identification information and command intent information. The preset identification information identifying a preset signal source of the media playback device, and the command intent information including a request for playback. Next, the method comprises identifying the preset command by converting the audio clip to a text format and determining the preset identification information and the command intent information from the text format, identifying a media context associated with the preset signal source based on the preset identification information, and transmitting the media context to the media playback device for playback.

Another aspect is a method of assigning a media context to a preset signal source of a media playback device. The method comprises transmitting a media context to the media playback device for playback; upon playing the media context using the media playback device, obtaining an audio clip of an instruction representative of a save preset command from the media playback device, the save preset command having preset identification information and command intent information, the preset identification information identifying the preset signal source of the media playback device, and the command intent information including a request to associate media context with the preset signal source; identifying the save preset command by converting the audio clip to a text format and determining the preset identification information and the command intent information from the text format; and associating the media context with the preset signal source of the media playback device.

Yet another aspect is a method for playing a media content item via a voice command. The method includes receiving an audio clip of a parameter and associated the parameter with a shortcut, wherein the shortcut comprises a plurality of media context items; receiving an audio clip of an instruction, the instruction including an activation trigger portion identifying a wake signal, a command portion identifying intent information, and a parameter portion identifying a shortcut identification information associated with the shortcut; identifying the instruction by converting the audio clip to a text format and determining the intent information and the shortcut identification information from the text format; identifying the media context items associated with the shortcut based on the shortcut identification information; and transmitting the media context items to the media playback device for playback.

Yet another aspect is a system for operating a voice command interface configured to control a media playback device. The system includes a speech recognition engine configured to receive an audio clip of a parameter and associated the parameter with a shortcut; the shortcut comprises a plurality of media context items. The speech recognition engine also receives an audio clip of an instruction. The instruction includes an activation trigger portion identifying a wake signal, a command portion identifying intent information, and a parameter portion identifying a shortcut identification information associated with the shortcut. A speech analysis engine is configured to identify the instruction by converting the audio clip to a text format and determining the intent information and the shortcut identification information from the text format, identify the media context items associated with the shortcut based on the shortcut identification information; and transmit the media context items to the media playback device for playback.

DETAILED DESCRIPTION

Figure 1:
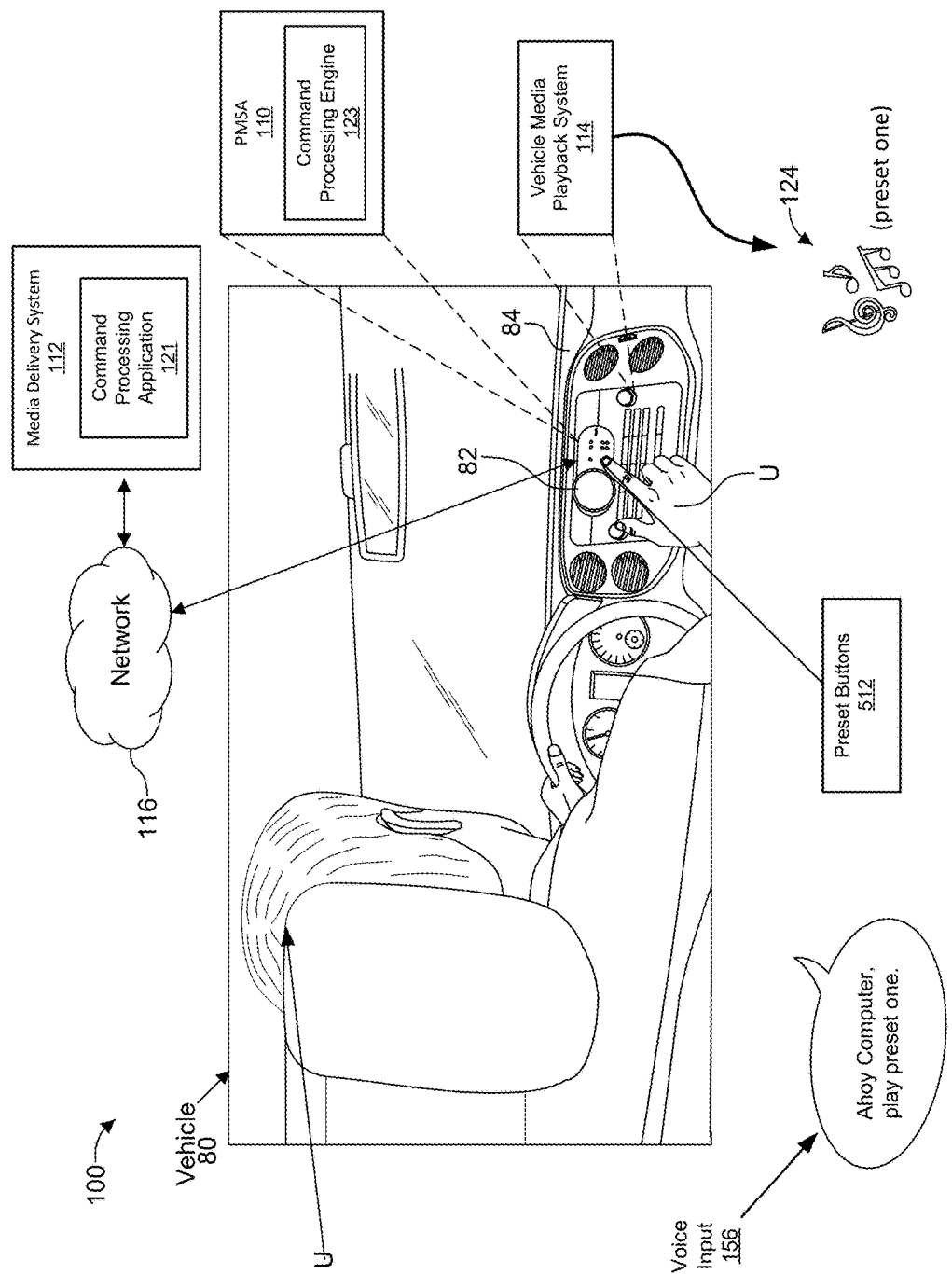
FIG. 1 illustrates a system for streaming media content for playback in accordance with an example embodiment of the present disclosure.

Various embodiments will be described in detail with reference to the drawings, wherein like reference numerals represent like parts and assemblies throughout the several views.

People spend a significant amount of time traveling in vehicles. Many of them find that time to be more enjoyable when they are listening to music, watching videos, or otherwise consuming media content. Media content includes audio and video content. Examples of audio content include songs, albums, playlists, radio stations, podcasts, audiobooks, and other audible media content items. Examples of video content include movies, music videos, television programs, and other visible media content items. In many cases, video content also includes audio content. As used herein, the term "vehicle" can be any machine that is operable to transport people or cargo. Vehicles can be motorized or non-motorized. Vehicles can be for public or private transport. Examples of vehicles include motor vehicles (e.g., cars, trucks, buses, motorcycles), rail vehicles (e.g., trains, trams), tracked vehicles, watercraft (e.g., ships, boats), aircraft, human-powered vehicles (e.g., bicycles), wagons, and other transportation means. A user can drive a vehicle or ride in as a passenger for traveling. As used herein, the term "travel" and variants thereof refers to any activity in which a user is in transit between two locations.

Consuming media content in a vehicle presents many challenges. In general, a user in a moving vehicle may have limited attention available for interacting with a media playback device due to the need to concentrate on travel related activities, such as driving and navigation. Therefore, while a vehicle is moving, it can be difficult for a user in the vehicle to safely interact with a media playback device without disrupting the driving or navigating. Further, the user interface of a media playback device built in a vehicle, or the user interface of a media playback device separately provided and used in a vehicle, typically provides control elements (e.g., physical buttons and knobs, or graphical icons and buttons) that are not easy to identify, navigate, and control while the vehicle is in operation. While some devices provide voice-based user interfaces, such interfaces encounter significant challenges to use in a vehicle environment. The passenger areas of a vehicle are often noisy due to engine noise, road noise, and any currently-playing media content items. This noise hampers the ability of a user to interact with the voice-based user interface. Moreover, accessing media content while traveling may be difficult, expensive, or impossible depending on network availability or capacity along the route of travel. Further, accessing and playing media content can require significant amounts of electric power. Thus, when a mobile device is used for media content playback, draining a battery can be a challenge for a longer travel and a longer use of the mobile device without recharging. It can also be challenging to connect a media playback device to a vehicle built-in audio system for playback while traveling in a vehicle. Embodiments disclosed herein address some or all of these challenges. It should be understood, however, that various aspects described herein are not limited to use a media playback device during travel.

On the other hand, many users desire personalized media consuming experience. For example, a user can access almost limitless catalogs of media content through various free or fee-based media delivery services, such as media streaming services. Users can use mobile devices or other media playback devices to access large catalogs of media content. Due to such large collections of media content, it is desired to make it possible to customize a selection of media content to fit well with users' individual desire to consume their favorite media content while driving or riding in a vehicle.

Many vehicles include a built-in media playback device, such as a radio or a fixed media player, such as a player that can play media content from a CD, USB driver, or SD cards. However, the media content that is delivered using these built in vehicle media playback devices is greatly limited and is not flexible or customizable to the user.

Alternatively, a mobile device, such as a smartphone and a tablet, is typically used by a user to enjoy personalized and flexible music consuming experience in a vehicle by running music streaming applications thereon. However, mobile devices are not well suited for a vehicle environment for various reasons. For example, mobile devices are not readily retrievable or controllable while driving or navigating. Further, connection between a mobile device and a vehicle audio system is often inconvenient and unreliable. Moreover, the music streaming application is not automatically ready to run and play media content, and the user needs to pick up the mobile device and open the music streaming application and control a sophisticated user interface to play media content. Additionally, many users have limited mobile data available via their mobile devices and are concerned about data usage while using the music streaming application in the vehicle. Battery drainage and legal restrictions (e.g., safety restrictions while driving) are further drawbacks to using mobile devices for playing media content in the vehicle.

To address these challenges, the present disclosure provides a special-purpose personal appliance for streaming media in a vehicle. The appliance is also referred to herein as the personal media streaming appliance (PMSA), the smart vehicle media appliance (SVMA), the personal vehicle media streaming appliance (PVMSA), or the like. The appliance is specially designed to be dedicated for media streaming purposes in a vehicle, and there is no other general use. Some embodiments of the appliance can operate to communicate directly with a media content server and receive the streaming of media content from the server via a cellular network. In these embodiments, other computing devices, such mobile devices, are not involved in this direct communication between the appliance and the media content server. Mobile data cost can be included in the subscription of the media streaming service or a purchase price of the personal appliance. Therefore, the customer's possible concern about mobile data usage can be eliminated. In other embodiments, the appliance can connect to a mobile device that provides a mobile hotspot to enable the appliance to communicate with the media content server.

Further, the appliance can be associated with a user account of the user for the media streaming service so that the user can enjoy personalized media content.

In some embodiments, the appliance provides a simplified user interface so that a user can easily control playback of media content in a vehicle while maintaining his or her focus on other tasks such as driving or navigating. For example, the appliance has a limited set of physical control elements that are intuitively controllable for playback of media content with little (often only one) input from a user. Examples of such physical control elements include a rotatable knob and one or more physically-depressible buttons.

Further, in some embodiments, the appliance is configured to be easily mounted to an interior structure of a vehicle, such as a dashboard, so that the user can easily reach the appliance.

In some embodiments, the appliance also provides an output interface that can be easily connected to a vehicle audio system, such as via an auxiliary input port or Bluetooth®. Therefore, the media content streamed to the appliance can then be transmitted from the appliance to the vehicle audio system for playback in the vehicle.

In some embodiments, the appliance can include a voice interaction system designed for voice interaction with a user in the noisy environment of a vehicle. In some embodiments, the appliance includes multiple microphones that reduce the effects of ambient noise in the passenger area of the vehicle. In an example, the appliance includes at least three microphones: two directed to the passenger area of the vehicle and another facing away from the passenger area of the vehicle to pick up vibrations and low frequency noise for cancellation. The appliance also applies spectral noise cancellation to reduce non-voice frequencies. In addition, omni-directional noise cancellation is applied in some embodiments to reduce omni-directional sound (e.g., vehicle noise). Directional noise is detected by determining a difference between audio input detected by the two microphones facing the passenger area. The difference is preserved as directional audio input. The appliance further cancels out audio that it is currently playing, allowing the appliance to detect voice commands even over loud music, for instance. In this manner, the appliance is arranged to provide an improved voice-based interface in a vehicle environment.

In addition, the personal vehicle media streaming appliance can provide various features that enable a quality voice interaction in a vehicle. In some embodiments, the personal vehicle media streaming appliance includes multiple microphones in an arrangement to resist the effects of ambient noise in the passenger area of the vehicle. In an example, the appliance includes at least three microphones: two directed to the passenger area of the vehicle and another facing away from the passenger area of the vehicle to pick up vibrations and low frequency noise for cancellation. The appliance also applies spectral noise cancellation to reduce non-voice frequencies. In addition, omni-directional noise cancellation is applied to reduce omni-directional sound (e.g., vehicle noise). Directional noise is detected by determining a difference between audio input between the two microphones facing the passenger area. The difference is preserved as directional audio input. The appliance further cancels out the audio that it is providing for playback, allowing a user to provide voice commands without needing to shout over loud music, for instance. In this manner, the appliance is arranged to provide an improved voice-based interface in a vehicle environment.

Further, the present disclosure generally relates to a system and method for playing a media content item via a voice command. The method includes obtaining an instruction from a user. The instruction includes an activation trigger portion, a command portion, and a parameter portion. The activation trigger portion identifies a wake signal, the command portion identifies intent information, and the parameter portion identifies a preset identification information associated with a preset signal source. In an example, presets are associated with a physical button on a Personal Media Streaming Appliance (PMSA). In another example, only some of the presets are associated with physical buttons on the PMSA. In those embodiments, presets are referred to as shortcuts. For purposes herein, presets and shortcuts are analogous, except that shortcuts do not correspond directly to physical buttons on the PMSA.

As described herein, consuming media content may include one or more of listening to audio content, watching video content, or consuming other types of media content. For ease of explanation, the embodiments described in this application are presented using specific examples. For example, audio content (and in particular music) is described as an example of one form of media consumption. As another example, a vehicle is described as an example of an environment in which media content is consumed. Further, traveling (and in particular driving) in a vehicle is described as an activity during which media content is consumed. However, it should be understood that the same concepts are similarly applicable to other forms of media consumption and to other environments or activities, and at least some embodiments include other forms of media consumption and/or are configured for use in other environments or during other activities.

FIG. 1 illustrates an example system 100 for streaming media content for playback. The system 100 can be used in a vehicle 80. The vehicle 80 includes a dashboard 82 or a head unit 84. The system 100 includes one or more media playback devices configured to play media content, such as a personal media streaming appliance (PMSA) system 110, a media delivery system 112, a vehicle media playback system 114, and a mobile computing device (not shown). The system 100 further includes a data communication network 116 and an in-vehicle wireless data communication network (not shown).

The PMSA system 110 operates to receive media content that is provided (e.g., streamed, transmitted, etc.) by a system external to the PMSA system 110, such as the media delivery system 112, and transmit the media content to the vehicle media playback system 114 for playback. In some embodiments, the PMSA system 110 is a portable device which can be carried into and used in the vehicle 80. The PMSA system 110 can be mounted to a structure of the vehicle 80, such as the dashboard 82 or the head unit 84. In other embodiments, the PMSA system 110 can be configured to be built in a structure of the vehicle 80. An example of the PMSA system 110 is illustrated and described in more detail with reference to FIGS. 2 and 6.

The media delivery system 112 operates to provide media content to one or more media playback devices 104 via the network 116. In the illustrated example, the media delivery system 112 provides media content to the PMSA system 110 for playback of media content using the vehicle media playback system 114. An example of the media delivery system 112 is illustrated and described in further detail herein, such as with reference to FIG. 3.

In some embodiments, the media delivery system 112 includes a command processing application 121. As described further in FIG. 7, the command processing application 121 includes a speech input engine 702, which includes a speech trigger activation engine 702, a speech recognition engine 704, and a speech analysis engine 706. In another embodiment, the PMSA 110 includes a command processing engine 123. As described further in FIG. 8, the command processing application 123 includes a speech input application 800, which includes a speech trigger activation application 802, a speech recognition application 804, and a speech analysis application 806.

The vehicle media playback system 114 operates to receive media content from the PMSA 110 and generates an action 124, which may include playing the media content in the vehicle 80. An example of the vehicle media playback system 114 is further described and illustrated herein including the description with reference to FIG. 4.

The PMSA system 110 operates to receive information via multiple inputs, for example, voice input 156 from a user U. In an example, a user U speaks an instruction (also referred to herein as a voice command) that is recognized and analyzed, and the PMSA system 110 generates an action. In the illustrated example, the user U says "Ahoy computer, play preset one," which includes a wake phrase and a command, as discussed in further detail herein. The wake phrase and command are received and analyzed by the system 100 (such as by at least one of the PMSA 110 and the media delivery system 112). In some embodiments, the analysis of the voice instruction involves the media delivery system 112, and more specifically the command processing application 121. Upon analysis, the PMSA system 110 or the media delivery system 112 determines that the user U has provided the wake phrase and command, and determines an action to take based on the receipt of the command. In this example, the command "play preset one" includes a command portion ("play") and a parameter portion ("preset one"). The play command is understood by the system 100 as an instruction to initiate playback of media content by the PMSA 110. The parameter portion is understood by the system 100 as containing instructions on what media content is to be played. In this example, the parameter portion identifies media context associated with one of the preset buttons 512 for playback. The preset buttons 512 (including, for example, preset one 512a, preset two 512b, preset three 512c, and preset four 512d) are discussed in more detail herein with reference to FIG. 6.

After determining that the voice instruction was a command to play media context associated with one of the preset buttons (preset one 512a, of FIG. 6), playback of preset one media content is initiated from the media delivery system 112 and the PMSA 110. Once initiated, the action 124 of the media context associated with the preset one context is generated through the vehicle media playback system 114. Several other examples of possible actions include assigning a media context item to a preset button 512, advancing playback to a next media context item, and creating an alias for a preset button.

The network 116 is a data communication network that facilitates data communication between the PMSA system 110 and the media delivery system 112. In some embodiments, the mobile computing device 118 can also communicate with the media delivery system 112 across the network 116. The network 116 typically includes a set of computing devices and communication links between the computing devices. The computing devices in the network 116 use the links to enable communication among the computing devices in the network. The network 116 can include one or more routers, switches, mobile access points, bridges, hubs, intrusion detection devices, storage devices, standalone server devices, blade server devices, sensors, desktop computers, firewall devices, laptop computers, handheld computers, mobile telephones, vehicular computing devices, and other types of computing devices.

In various embodiments, the network 116 includes various types of communication links. For example, the network 116 can include wired and/or wireless links, including cellular, Bluetooth®, ultra-wideband (UWB), 802.11, ZigBee, and other types of wireless links. Furthermore, in various embodiments, the network 82 is implemented at various scales. For example, the network 116 can be implemented as one or more vehicle area networks, local area networks (LANs), metropolitan area networks, subnets, wide area networks (WAN) (such as the Internet), or can be implemented at another scale. Further, in some embodiments, the network 116 includes multiple networks, which may be of the same type or of multiple different types.

In some embodiments, the network 116 can also be used for data communication between other media playback devices 104 (e.g., the mobile computing device 118) and the media delivery system 112. Because the network 116 is configured primarily for data communication between computing devices in the vehicle 102 and computing devices outside the vehicle 102, the network 116 is also referred to herein as an out-vehicle network or out-vehicle data communication.

Unlike the network 116, the in-vehicle wireless data communication 122 can be used for data communication between computing devices (e.g., the media playback devices 104) in the vehicle. In the illustrated example, the in-vehicle wireless data communication 122 is used between the PMSA system 110 and the mobile computing device 118. In other embodiments, the in-vehicle wireless data communication 122 can also be used for data communication between the PMSA system 110 and the vehicle media playback system 114.

Various types of wireless communication interfaces can be used for the in-vehicle wireless data communication 122. In some embodiments, the in-vehicle wireless data communication 122 includes Bluetooth® technology. In other embodiments, the in-vehicle wireless data communication 122 includes WiFi® technology. In yet other embodiments, other suitable wireless communication interfaces can be used for the in-vehicle wireless data communication 122, such as near field communication (NFC) and an ultrasonic data transmission.

In some embodiments, a mobile computing device (not shown) is configured to play media content independently from the PMSA system 110. In some embodiments, the mobile computing device is a standalone computing device that, without the PMSA system 110 involved, can communicate with the media delivery system 112 and receive media content from the media delivery system 112 for playback in the vehicle 80. An example of the mobile computing device 118 is illustrated and described in further detail herein, such as with reference to FIG. 5.

Figure 2:
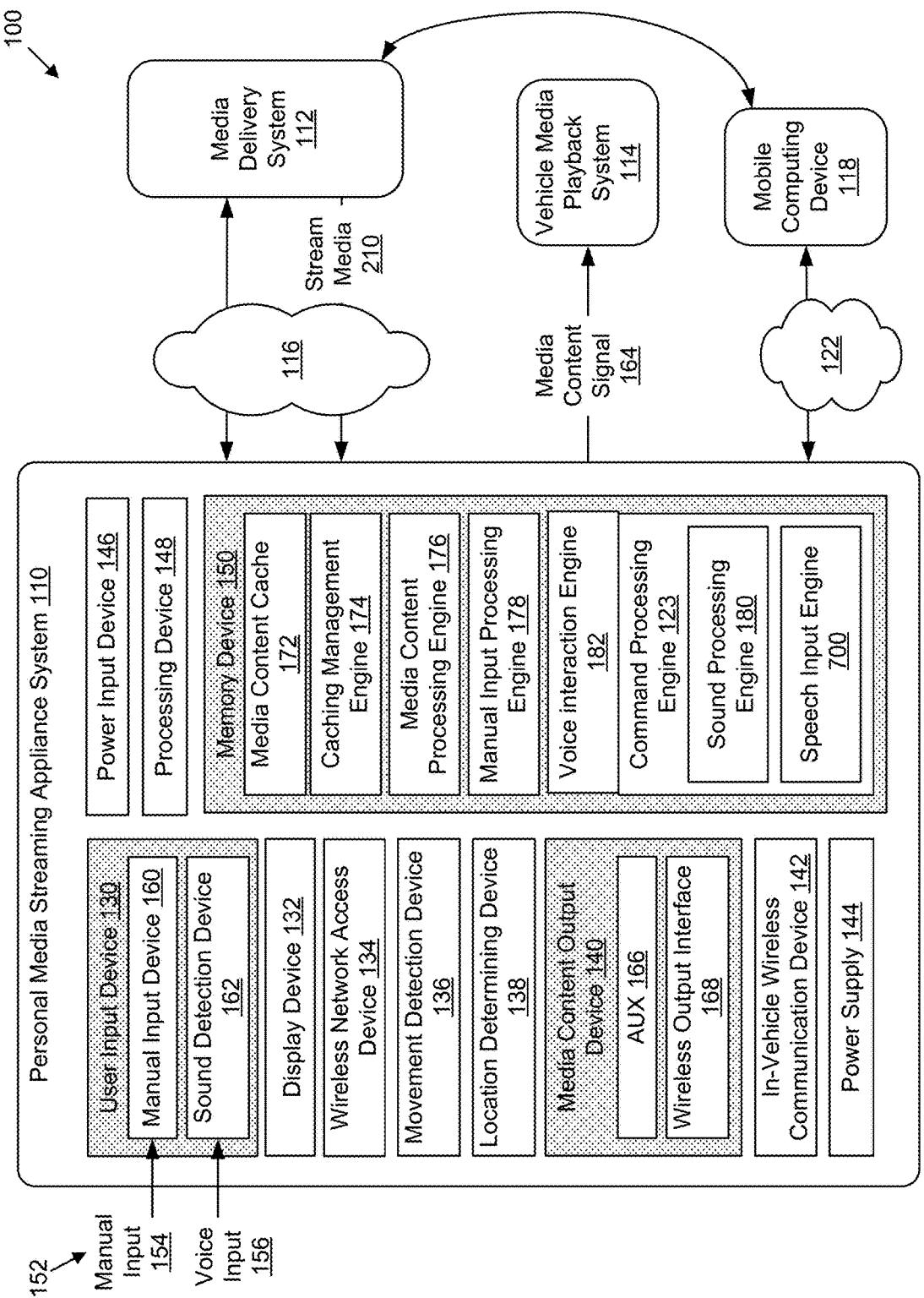
FIG. 2 is a block diagram of an example embodiment of a personal media streaming appliance (PMSA) system.

FIG. 2 is a block diagram of an example embodiment of the PMSA system 110 of the media streaming system 100 shown in FIG. 1. In this example, the PMSA system 110 includes a user input device 130, a display device 132, a wireless network access device 134, a movement detection device 136, a location determining device 138, a media content output device 140, an in-vehicle wireless communication device 142, a power supply 144, a power input device 146, a processing device 148, and a memory device 150.

In some embodiments, the PMSA system 110 is a system dedicated for streaming personalized media content in a vehicle environment. At least some embodiments of the PMSA system 110 have limited functionalities specific for streaming media content from the media delivery system 112 at least via the network 116 and/or for providing other services associated with the media content streaming service. The PMSA system 110 may have no other general use such as found in other computing devices, such as smartphones, tablets, and other smart devices. For example, when the PMSA system 110 is powered up, the PMSA system 110 is configured to automatically activate, restart, or resume a software application that is configured to perform the media content streaming operation dedicated for the PMSA system 110 by operating at least one of the components, devices, and elements of the PMSA system 110. In some embodiments, the software application of the PMSA system 110 is configured to continue running until the PMSA system 110 is powered off or powered down to a predetermined level. The PMSA system 110 is configured to be free of any user interface control that would allow a user to disable the activation of the software application on the PMSA system 110.

As described herein, the PMSA system 110 provides various structures, features, and functions that improve the user experience of consuming media content in a vehicle.

As illustrated, the PMSA system 110 can communicate with the media delivery system 112 to receive media content via the network 116 and enable the vehicle media playback system 114 to play the media content in the vehicle. In some embodiments, the PMSA system 110 can communicate with the mobile computing device 118 that is in data communication with the media delivery system 112. As described herein, the mobile computing device 118 can communicate with the media delivery system 112 via the network 116.

The user input device 130 operates to receive a user input 152 from a user U for controlling the PMSA system 110. As illustrated, the user input 152 can include a manual input 154 and a voice input 156. In some embodiments, the user input device 130 includes a manual input device 160 and a sound detection device 162.

The manual input device 160 operates to receive the manual input 154 for controlling playback of media content via the PMSA system 110. In addition, in some embodiments, the manual input 154 is received for managing various pieces of information transmitted via the PMSA system 110 and/or controlling other functions or aspects associated with the PMSA system 110.

In some embodiments, the manual input device 160 includes one or more manual control elements configured to receive various manual control actions, such as pressing actions and rotational actions. As described herein, the manual input device 160 includes a manual control knob 510 and one or more physical buttons 512, which is further described and illustrated with reference to FIG. 6.

The sound detection device 162 operates to detect and record sounds proximate the PMSA system 110. For example, the sound detection device 162 can detect sounds including the voice input 156 (also referred to herein as an instruction). In some embodiments, the sound detection device 162 includes one or more acoustic sensors configured to detect sounds proximate the PMSA system 110. For example, acoustic sensors of the sound detection device 162 includes one or more microphones. Various types of microphones can be used for the sound detection device 162 of the PMSA system 110.

In some embodiments, the voice input 156 is a user's instruction for controlling playback of media content via the PMSA system 110. In addition, the voice input 156 is a user's voice for managing various data transmitted via the PMSA system 110 and/or controlling other functions or aspects associated with the PMSA system 110. Voice inputs 156 can function similar to manual inputs 154 to control PMSA system 110.

In some embodiments, the sound detection device 162 is configured to cancel noises from the received sounds so that a desired sound (e.g., the voice input 156) is clearly identified. For example, the sound detection device 162 can include one or more noise-canceling microphones that are configured to filter ambient noise from the voice input 156. In addition or alternatively, a plurality of microphones of the sound detection device 162 is arranged at different locations in a body of the PMSA system 110 and/or oriented in different directions with respect to the body of the PMSA system 110, so that ambient noise is effectively canceled from the voice input 156 or other desired sounds being identified.

In some embodiments, the sounds detected by the sound detection device 162 can be processed by the sound processing engine 180 of the PMSA system 110 as described below.

Referring still to FIG. 2, the display device 132 operates to display various pieces of information to the user U. Examples of such information include playback information of media content, notifications, and other information.

In some embodiments, the display device 132 operates as a display screen only and is not capable of receiving a user input. By receiving the manual input 154 only via the manual input device 160 and disabling receipt of the manual input 154 via the display device 132, the user interface of the PMSA system 110 is simplified so that the user U can safely control the PMSA system 110 without significant distraction in the vehicle 102. It is understood however that, in other embodiments, the display device 132 is configured as a touch-sensitive display screen that operates as both a display screen and a user input device. In yet other embodiments, the PMSA system 110 does not include a display device.

As described herein, in some embodiments, the display device 132 is arranged at the manual input device 160. In other embodiments, the display device 132 is arranged separate to the manual input device 160.

The wireless data communication device 134 operates to enable the PMSA system 110 to communicate with one or more computing devices at a remote location that is outside the vehicle 80. In the illustrated example, the wireless data communication device 134 operates to connect the PMSA system 110 to one or more networks outside the vehicle 80, such as the network 116. For example, the wireless data communication device 134 is configured to communicate with the media delivery system 112 and receive media content from the media delivery system 112 at least partially via the network 116. The wireless data communication device 134 can be a wireless network interface of various types, which connects the PMSA system 110 to the network 116. Examples of the wireless data communication device 134 include wireless wide area network (WWAN) interfaces, which use mobile telecommunication cellular network technologies. Examples of cellular network technologies include LTE, WiMAX, UMTS, CDMA2000, GSM, cellular digital packet data (CDPD), and Mobitex. In some embodiments, the wireless data communication device 134 is configured as a cellular network interface to facilitate data communication between the PMSA system 110 and the media delivery system 112 over cellular network.

The movement detection device 136 can be used to detect movement of the vehicle 102. In some embodiments, the movement detection device 136 is configured to monitor one or more factors that are used to determine movement of the vehicle 102. The movement detection device 136 can include one or more sensors that are configured to detect movement, position, and/or orientation of the PMSA system 110. As an example, the movement detection device 136 may determine an orientation of the PMSA system 110 with respect to a primary direction of gravitational acceleration. The movement detection device 136 may detect changes in the determined orientation and interpret those changes as indicating movement of the PMSA system 110. In some embodiments, the movement detection device 136 includes an accelerometer. In other embodiments, the movement detection device 136 includes a gyroscope. Other sensors can also be used for the movement detection device 136, such as a magnetometer, a GPS receiver, an altimeter, an odometer, a speedometer, a shock detector, a vibration sensor, a proximity sensor, and an optical sensor (e.g., a light sensor, a camera, and an infrared sensor).

The location determining device 138 is a device that determines the location of the PMSA system 110. In some embodiments, the location determining device 138 uses one or more of Global Positioning System (GPS) technology (which may receive GPS signals), Global Navigation Satellite System (GLONASS), cellular triangulation technology, network-based location identification technology, Wi-Fi® positioning systems technology, and combinations thereof.

The media content output device 140 is an interface that enables the PMSA system 110 to transmit media content to the vehicle media playback system 114. Some embodiments of the PMSA system 110 do not have a speaker and thus cannot play media content independently. In these embodiments, the PMSA system 110 is not regarded as a standalone device for playing media content. Instead, the PMSA system 110 transmits media content to another media playback device, such as the vehicle media playback system 114 to enable the other media playback device to play the media content, such as through the vehicle stereo system.

As illustrated, the PMSA system 110 (e.g., a media content processing engine 176 thereof in FIG. 2) can convert media content to a media content signal 164, the media content output device 140 transmits the media content signal 164 to the vehicle media playback system 114. The vehicle media playback system 114 can play the media content based on the media content signal 164. For example, the vehicle media playback system 114 operates to convert the media content signal 164 into a format that is readable by the vehicle media playback system 114 for playback.

In some embodiments, the media content output device 140 includes an auxiliary (AUX) output interface 166 and a wireless output interface 168.

Figure 6:
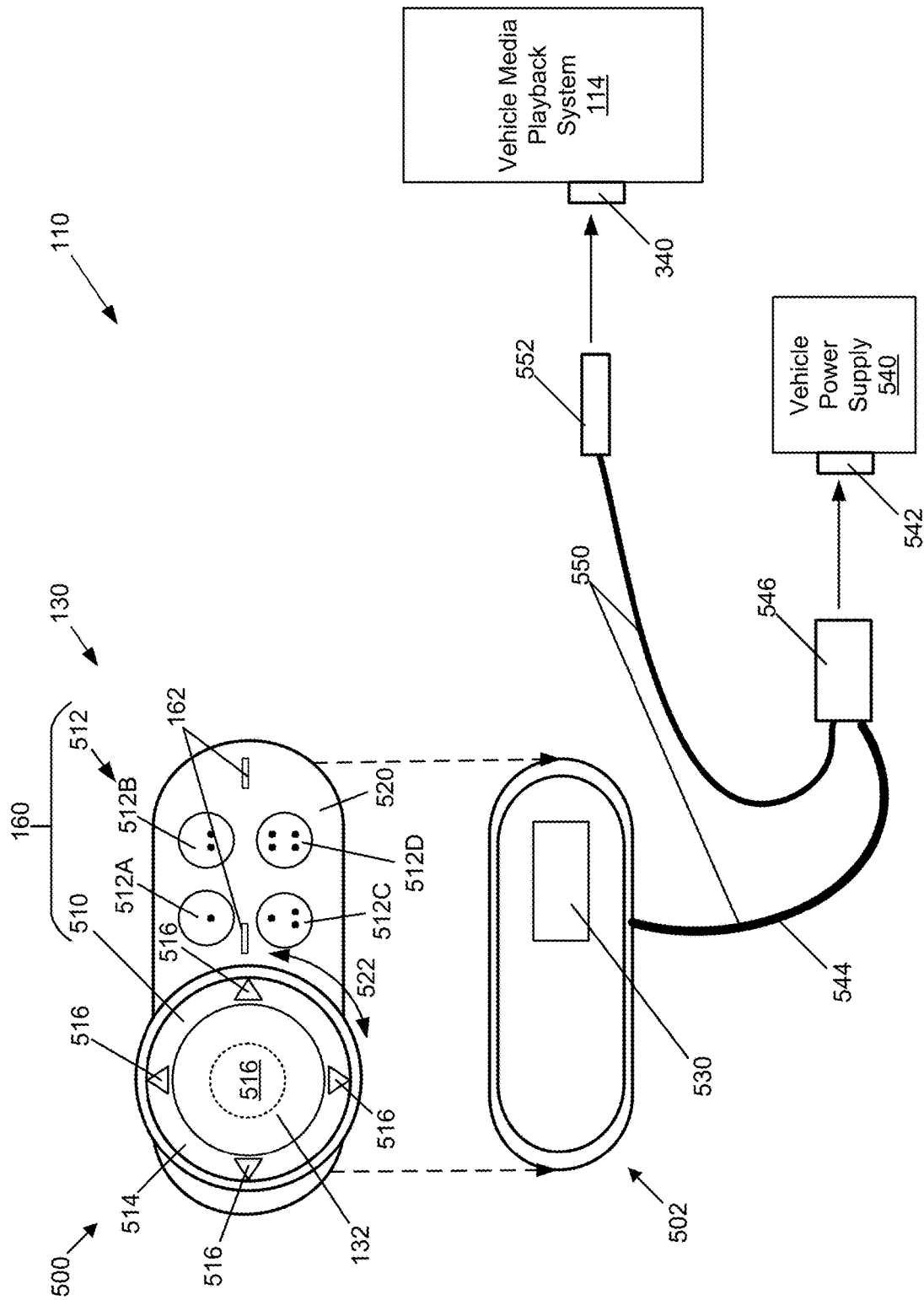
FIG. 6 schematically illustrates an example embodiment of the PMSA system.

The AUX output interface 166 is configured to connect the PMSA system 110 to the vehicle media playback system 114 via a cable (e.g., a media content output line 550 in FIG. 6) of the PMSA system 110. In some embodiments, as illustrated in FIG. 6, the media content output line 550 extending from the PMSA system 110 is connected to an input connector 340 (e.g., an auxiliary input jack or port) of the vehicle media playback system 114. As illustrated herein, the media content output line 550 can be of various types, such as an analog audio cable or a USB cable.

The wireless output interface 168 is configured to connect the PMSA system 110 to the vehicle media playback system 114 via a wireless communication protocol. In some embodiments, the wireless output interface 168 is configured for Bluetooth® connection. In other embodiments, the wireless output interface 168 is configured for other types of wireless connection. In some embodiments, the wireless output interface 168 is incorporated into, or implemented with, the in-vehicle wireless communication device 142. For example, when the media content output device 140 wirelessly transmits media content to the vehicle media playback system 114, the in-vehicle wireless communication device 142 can be used to implement the wireless output interface 168 of the media content output device 140.

Referring still to FIG. 2, the in-vehicle wireless communication device 142 operates to establish a wireless data communication, such as the in-vehicle wireless data communication 122, between computing devices in a vehicle 80. In the illustrated example, the in-vehicle wireless communication device 142 is used to enable the PMSA system 110 to communicate with other computing devices, such as the mobile computing device 118, in the vehicle 80. Various types of wireless communication interfaces can be used for the in-vehicle wireless communication device 142, such as Bluetooth® technology®, WiFi® technology, a near field communication (NFC), and an ultrasound data transmission. The in-vehicle wireless communication is also referred to herein as a short-range wireless communication.

The power supply 144 is included in the example PMSA system 110 and is configured to supply electric power to the PMSA system 110. In some embodiments, the power supply 144 includes at least one battery. The power supply 144 can be rechargeable. For example, the power supply 144 can be recharged using the power input device 146 that is connected to an external power supply. In some embodiments, the power supply 144 is included inside the PMSA system 110 and is not removable from the PMSA system 110. In other embodiments, the power supply 144 is removable by the user from the PMSA system 110.

The power input device 146 is configured to receive electric power to maintain activation of components of the PMSA system 110. As described herein, the power input device 146 is connected to a power source of the vehicle 80 (e.g., a vehicle power supply 540 in FIG. 6) and use the electric power from the vehicle 80 as a primary power source to maintain activation of the PMSA system 110 over an extended period of time, such as longer than several minutes.

The processing device 148, in some embodiments, comprises one or more central processing units (CPU). In other embodiments, the processing device 148 additionally or alternatively includes one or more digital signal processors, field-programmable gate arrays, or other electronic circuits.

The memory device 150 typically includes at least some form of computer-readable media. Computer readable media includes any available media that can be accessed by the PMSA system 110. By way of example, computer-readable media include computer readable storage media and computer readable communication media.

Computer readable storage media includes volatile and nonvolatile, removable and non-removable media implemented in any device configured to store information such as computer readable instructions, data structures, program modules, or other data. Computer readable storage media includes, but is not limited to, random access memory, read only memory, electrically erasable programmable read only memory, flash memory and other memory technology, compact disc read only memory, blue ray discs, digital versatile discs or other optical storage, magnetic storage devices, or any other medium that can be used to store the desired information and that can be accessed by the PMSA system 110. In some embodiments, computer readable storage media is non-transitory computer readable storage media.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The memory device 150 operates to store data and instructions. In some embodiments, the memory device 150 stores instructions for a media content cache 172, a caching management engine 174, a media content processing engine 176, a manual input processing engine 178, a command processing engine 123 comprising a sound processing engine 180, and a speech input engine 700. In an example, and as described in more detail with reference to FIGS. 7-8, the speech input engine 700 includes a speech trigger activation engine, a speech recognition engine, and a speech analysis engine. However, the speech input engine 700 need not contain all the engines, as they may be located at the media delivery system.

Some embodiments of the memory device 150 include the media content cache 172. The media content cache 172 stores media content items, such as media content items that have been received from the media delivery system 112. The media content items stored in the media content cache 172 may be stored in an encrypted or unencrypted format. In some embodiments, the media content cache 172 also stores metadata about media content items such as title, artist name, album name, length, genre, mood, era, etc. The media content cache 172 can further store playback information about the media content items and/or other information associated with the media content items.

The caching management engine 174 is configured to receive and cache media content in the media content cache 172 and manage the media content stored in the media content cache 172. In some embodiments, when media content is streamed from the media delivery system 112, the caching management engine 174 operates to cache at least a portion of the media content into the media content cache 172 so that at least a portion of the cached media content can be transmitted to the vehicle media playback system 114 for playback. In other embodiments, the caching management engine 174 operates to cache at least a portion of media content into the media content cache 172 while online so that the cached media content is retrieved for playback while the PMSA system 110 is offline.

The media content processing engine 176 is configured to process the media content that is received from the media delivery system 112, and generate the media content signal 164 usable for the vehicle media playback system 114 to play the media content. The media content signal 164 is transmitted to the vehicle media playback system 114 using the media content output device 140, and then decoded so that the vehicle media playback system 114 plays the media content in the vehicle 80.

The manual input processing engine 178 operates to receive the manual input 154 via the manual input device 160. In some embodiments, when the manual input device 160 is actuated (e.g., pressed or rotated) upon receiving the manual input 154, the manual input device 160 generates an electric signal representative of the manual input 154. The manual input processing engine 178 can process the electric signal and determine the user input (e.g., command or instruction) corresponding to the manual input 154 to the PMSA system 110. In some embodiments, the manual input processing engine 178 can perform a function requested by the manual input 154, such as controlling playback of media content. The manual input processing engine 178 can cause one or more other engines to perform the function associated with the manual input 154.

The sound processing engine 180 is configured to receive sound signals obtained from the sound detection device 162 and process the sound signals to identify different sources of the sounds received via the sound detection device 162. In some embodiments, the sound processing engine 180 operates to filter the user's voice input 156 from noises included in the detected sounds. Various noise cancellation technologies, such as active noise control or canceling technologies or passive noise control or canceling technologies, can be used for filter the voice input from ambient noise. In examples, the sound processing engine 180 filters out omnidirectional noise and preserves directional noise (e.g., an audio input difference between two microphones) in audio input. In examples, the sound processing engine 180 removes frequencies above or below human speaking voice frequencies. In examples, the sound processing engine 180 subtracts audio output of the device from the audio input to filter out the audio content being provided by the device. (e.g., to reduce the need of the user to shout over playing music). In examples, the sound processing engine 180 performs echo cancellation. By using one or more of these techniques, the sound processing engine 180 provides sound processing customized for use in a vehicle environment.

In other embodiments, the sound processing engine 180 operates to process the received sound signals to identify the sources of particular sounds of the sound signals, such as people's conversation in the vehicle, the vehicle engine sound, or other ambient sounds associated with the vehicle.

In some embodiments, a recording of sounds captured using the sound detection device 162 can be analyzed using speech recognition technology to identify words spoken by the user. The words may be recognized as commands from the user that alter the playback of media content and/or other functions or aspect of the PMSA system 110. In some embodiments, the words and/or the recordings may also be analyzed using natural language processing and/or intent recognition technology to determine appropriate actions to take based on the spoken words. Additionally or alternatively, the sound processing engine 180 may determine various sound properties about the sounds proximate the PMSA system 110 such as volume, dominant frequency or frequencies, etc. These sound properties may be used to make inferences about the environment proximate to the PMSA system 110.

Figure 3:
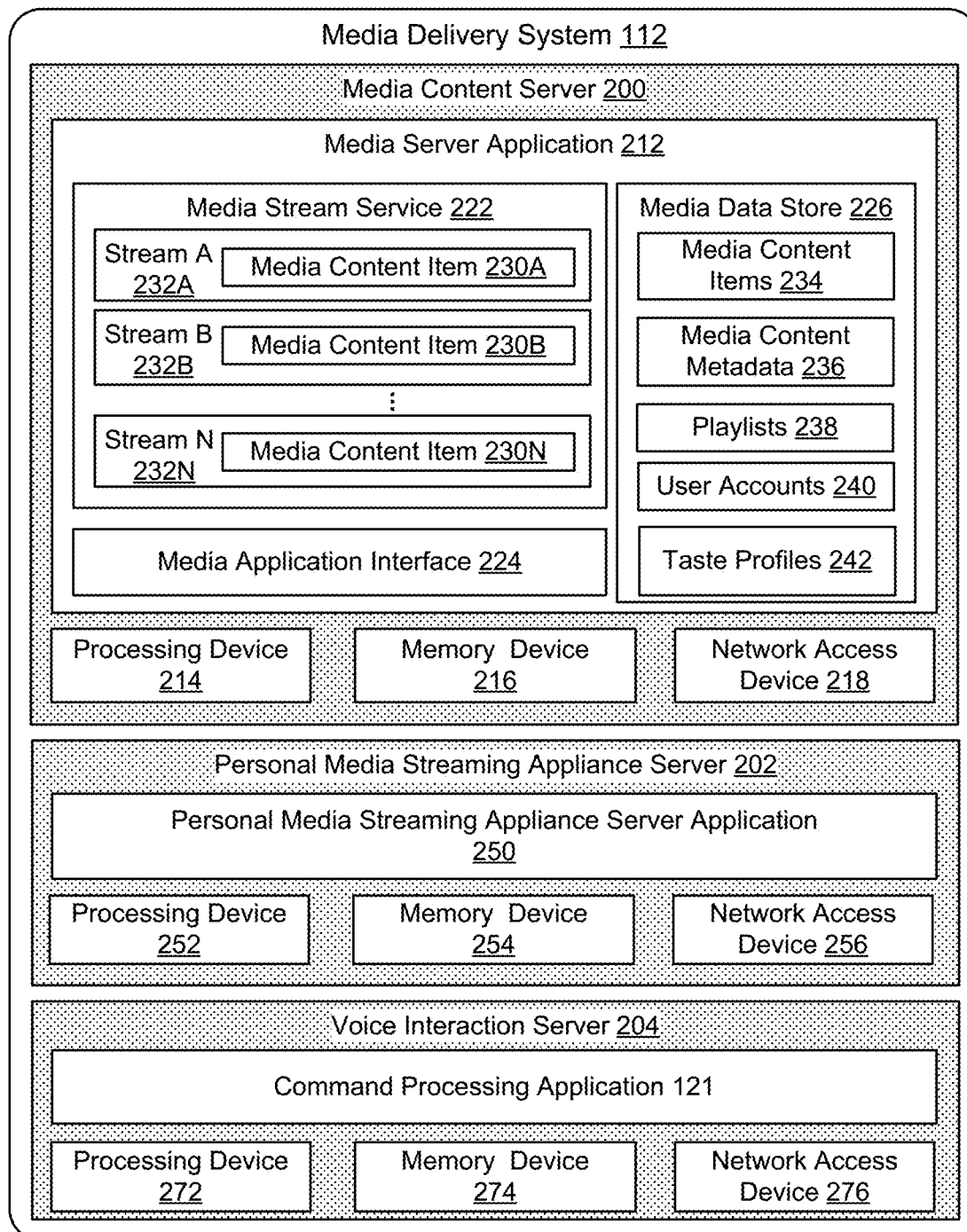
FIG. 3 is a block diagram of an example embodiment of a media delivery system.

The voice interaction engine 182 operates to cooperate with the media delivery system 112 (e.g., a voice interaction server 204 thereof as illustrated in FIG. 3) to identify a command (e.g., a user intent) that is conveyed by the voice input 156. In some embodiments, the voice interaction engine 182 transmits the user's voice input 156 that is detected by the sound processing engine 180 to the media delivery system 112 so that the media delivery system 112 operates to determine a command intended by the voice input 156. In other embodiments, at least some of the determination process of the command can be performed locally by the voice interaction engine 182.

In addition, some embodiments of the voice interaction engine 182 can operate to cooperate with the media delivery system 112 (e.g., the voice interaction server 204 thereof) to provide a voice assistant that performs various voice-based interactions with the user, such as voice feedbacks, voice notifications, voice recommendations, and other voice-related interactions and services.

Figure 7:
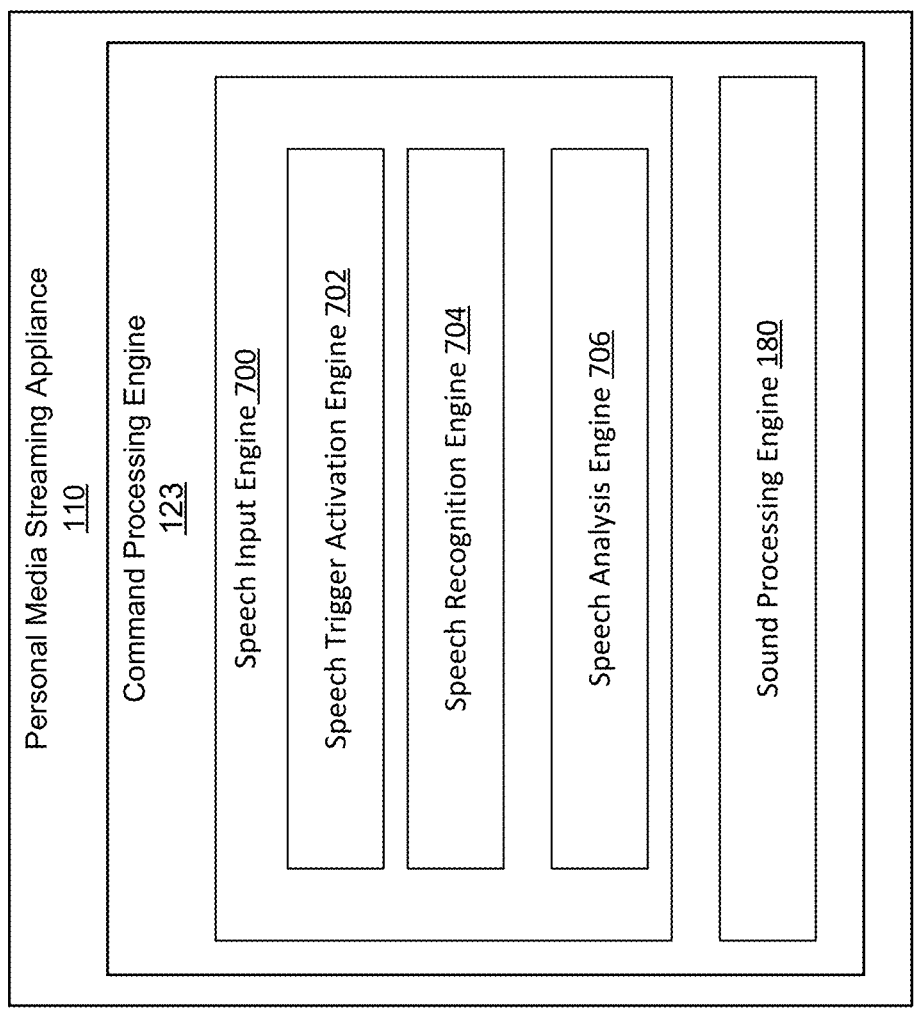
FIG. 7 is a block diagram of an example embodiment of a personal media streaming appliance server application.
Figure 8:
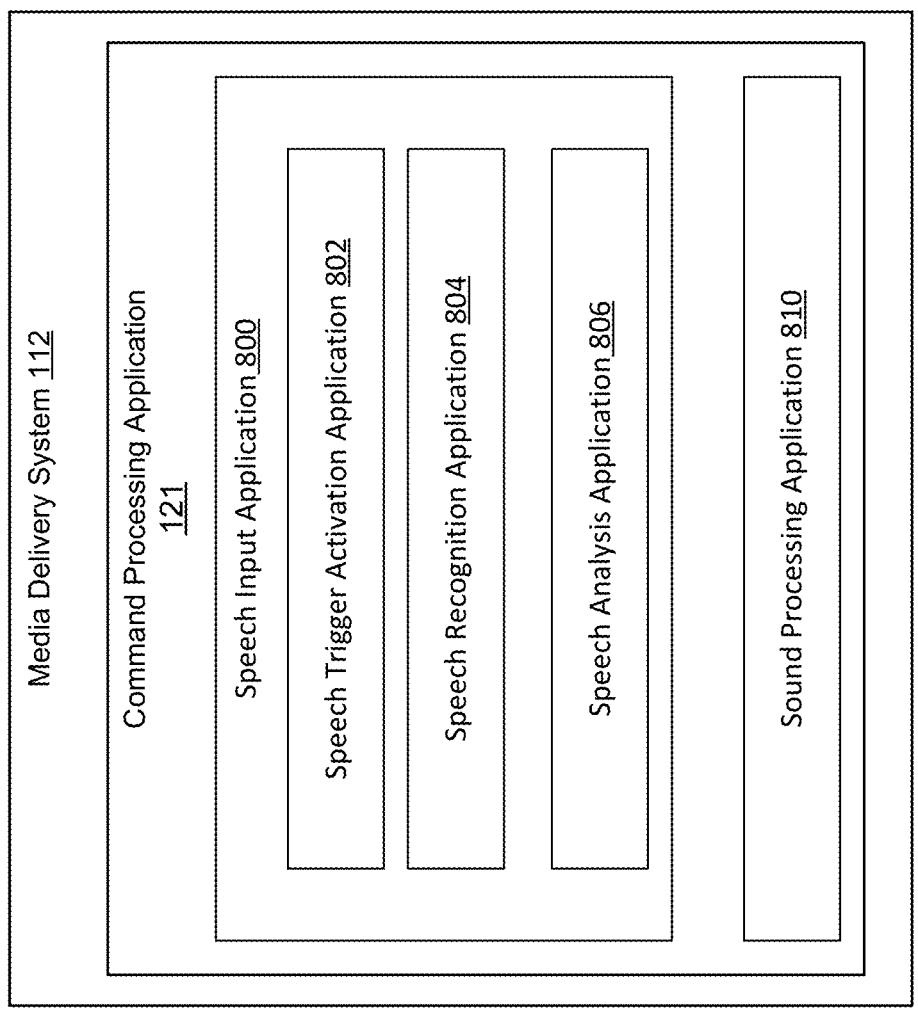
FIG. 8 is a block diagram of an example embodiment of a voice interaction server application.

In some embodiments, after the sound processing engine 180 captures a recording of sounds, the speech input engine 700 parses the sounds into segments recognizable by the speech trigger activation engine, speech recognition engine, and speech analysis engine, as described in further detail at FIGS. 7-8. The instruction (voice input) may be analyzed using natural language processing and/or intent recognition technology to convert the instruction to text and determine appropriate actions to take based on the spoken words. In other embodiments, not all of the functions of the speech input engine 700 are preformed by the PMSA 110, and instead the media delivery system 112 may perform some of the functions. Allowing engines to be located on the media delivery system 112 reduces costs associated with producing a PMSA 110. For example, the PMSA 110 reduces the processing power needed in the PMSA 110.

The command processing engine 123 operates to interact with the PMSA system 110 and enable the PMSA system 110 to perform various voice-related functions, such as voice feedback and voice notifications. In some embodiments, the speech input engine 700 is configured to receive data (e.g., speech-to-text (STT) data) representative of a voice input received via the PMSA system 110 and process the data to determine a user command (e.g., a user request or instruction). In some embodiments, at least one of the media content server 200, the PMSA server 202, and the voice interaction server 204 may be used to perform one or more functions corresponding the determined user command.

FIG. 3 is a block diagram of an example embodiment of the media delivery system 112 of FIG. 1. The media delivery system 112 includes a media content server 200, a personal media streaming appliance (PMSA) server 202, and a voice interaction server 204.

The media delivery system 112 comprises one or more computing devices and provides media content to the PMSA system 110 and, in some embodiments, other media playback devices, such as the mobile computing device 118, as well. In addition, the media delivery system 112 interacts with the PMSA system 110 to provide the PMSA system 110 with various functionalities.

In at least some embodiments, the media content server 200, the PMSA server 202, and the voice interaction server 204 are provided by separate computing devices. In other embodiments, the media content server 200, the PMSA server 202, and the voice interaction server 204 are provided by the same computing device(s). Further, in some embodiments, at least one of the media content server 200, the PMSA server 202, and the voice interaction server 204 is provided by multiple computing devices. For example, the media content server 200, the PMSA server 202, and the voice interaction server 204 may be provided by multiple redundant servers located in multiple geographic locations.

Although FIG. 3 shows a single media content server 200, a single PMSA server 202, and a single voice interaction server 204, some embodiments include multiple media servers, multiple PMSA servers, and/or multiple voice interaction servers. In these embodiments, each of the multiple media servers, multiple PMSA serves, and multiple voice interaction servers may be identical or similar to the media content server 200, the PMSA server 202, and the voice interaction server, respectively, as described herein, and may provide similar functionality with, for example, greater capacity and redundancy and/or services from multiple geographic locations. Alternatively, in these embodiments, some of the multiple media servers, the multiple PMSA servers, and/or the multiple voice interaction servers may perform specialized functions to provide specialized services. Various combinations thereof are possible as well.

The media content server 200 transmits stream media 210 (FIG. 2) to media playback devices such as the PMSA system 110. In some embodiments, the media content server 200 includes a media server application 212, a processing device 214, a memory device 216, and a network access device 218. The processing device 214 and the memory device 216 may be similar to the processing device 148 and the memory device 150, respectively, which have each been previously described. Therefore, the description of the processing device 214 and the memory device 216 are omitted for brevity purposes.

The network access device 218 operates to communicate with other computing devices over one or more networks, such as the network 106. Examples of the network access device include one or more wired network interfaces and wireless network interfaces. Examples of such wireless network interfaces of the network access device 218 include wireless wide area network (WWAN) interfaces (including cellular networks) and wireless local area network (WLANs) interfaces. In other examples, other types of wireless interfaces can be used for the network access device 218.

In some embodiments, the media server application 212 is configured to stream media content, such as music or other audio, video, or other suitable forms of media content. The media server application 212 includes a media stream service 222, a media application interface 224, and a media data store 226. The media stream service 222 operates to buffer media content, such as media content items 230A, 230B, and 230N (collectively 230), for streaming to one or more streams 232A, 232B, and 232N (collectively 232).

The media application interface 224 can receive requests or other communication from media playback devices or other systems, such as the PMSA system 110, to retrieve media content items from the media content server 200. For example, in FIG. 2, the media application interface 224 receives communication from the PMSA system 110, such as the caching management engine 174 thereof, to receive media content from the media content server 200.

In some embodiments, the media data store 226 stores media content items 234, media content metadata 236, playlists 238, user accounts 240, and taste profiles 242. The media data store 226 may comprise one or more databases and file systems. Other embodiments are possible as well.

As discussed herein, the media content items 234 (including the media content items 230) may be audio, video, or any other type of media content, which may be stored in any format for storing media content.

The media content metadata 236 provide various information associated with the media content items 234. In some embodiments, the media content metadata 236 includes one or more of title, artist name, album name, length, genre, mood, era, etc.

The media content metadata 236 operates to provide various pieces of information associated with the media content items 234. In some embodiments, the media content metadata 236 includes one or more of title, artist name, album name, length, genre, mood, era, etc.

In some embodiments, the media content metadata 236 includes acoustic metadata, cultural metadata, and explicit metadata. The acoustic metadata may be derived from analysis of the track refers to a numerical or mathematical representation of the sound of a track. Acoustic metadata may include temporal information such as tempo, rhythm, beats, downbeats, tatums, patterns, sections, or other structures.

Referring still to FIG. 3, each of the media contexts 238 is used to identify one or more media content items 234. In some embodiments, the media contexts 238 are configured to group one or more media content items 234 and provide a particular context to the group of media content items 234. Some examples of the media contexts 238 include albums, artists, playlists, and individual media content items. By way of example, where a media context 238 is an album, the media context 238 can represent that the media content items 234 identified by the media context 238 are associated with that album.

As described above, the media contexts 238 can include playlists 239. The playlists 238 are used to identify one or more of the media content items 234. In some embodiments, the playlists 238 identify a group of the media content items 234 in a particular order. In other embodiments, the playlists 238 merely identify a group of the media content items 234 without specifying a particular order. Some, but not necessarily all, of the media content items 234 included in a particular one of the playlists 238 are associated with a common characteristic such as a common genre, mood, or era.

In some embodiments, a user can listen to media content items in a playlist 238 by selecting the playlist 238 via a media playback device 104, such as the PMSA system 110. The media playback device 104 then operates to communicate with the media delivery system 112 so that the media delivery system 112 retrieves the media content items identified by the playlist 238 and transmits data for the media content items to the media playback device 104 for playback.

In some embodiments, the playlist 238 includes a playlist title and a list of content media item identifications. The playlist title is a title of the playlist, which can be provided by a user using the media playback device 104. The list of content media item identifications includes one or more media content item identifications (IDs) that refer to respective media content items 170.

Each media content item is identified by a media content item ID and includes various pieces of information, such as a media content item title, artist identification (e.g., individual artist name or group name, or multiple artist names or group names), and media content item data. In some embodiments, the media content item title and the artist ID are part of the media content metadata 236, which can further include other attributes of the media content item, such as album name, length, genre, mood, era, etc. as described herein.

At least some of the playlists 238 may include user-created playlists. For example, a user of a media streaming service provided using the media delivery system 112 can create a playlist 238 and edit the playlist 238 by adding, removing, and rearranging media content items in the playlist 238. A playlist 238 can be created and/or edited by a group of users together to make it a collaborative playlist. In some embodiments, user-created playlists can be available to a particular user only, a group of users, or to the public based on a user-definable privacy setting.

In some embodiments, when a playlist is created by a user or a group of users, the media delivery system 112 operates to generate a list of media content items recommended for the particular user or the particular group of users. In some embodiments, such recommended media content items can be selected based at least on the taste profiles 242 as described herein. Other information or factors can be used to determine the recommended media content items. Examples of determining recommended media content items are described in U.S. patent application Ser. No. 15/858,377, titled MEDIA CONTENT ITEM RECOMMENDATION SYSTEM, filed Dec. 29, 2017, the disclosure of which is hereby incorporated by reference in its entirety.

In addition or alternatively, at least some of the playlists 238 are created by a media streaming service provider. For example, such provider-created playlists can be automatically created by the media delivery system 112. In some embodiments, a provider-created playlist can be customized to a particular user or a particular group of users. By way of example, a playlist for a particular user can be automatically created by the media delivery system 112 based on the user's listening history (e.g., the user's taste profile) and/or listening history of other users with similar tastes. In other embodiments, a provider-created playlist can be configured to be available for the public in general. Provider-created playlists can also be sharable with to other users.

The user accounts 240 are used to identify users of a media streaming service provided by the media delivery system 112. In some embodiments, a user account 240 allows a user to authenticate to the media delivery system 112 and enable the user to access resources (e.g., media content items, playlists, etc.) provided by the media delivery system 112. In some embodiments, the user can use different devices (e.g., the PMSA system 110 and the mobile computing device 118) to log into the user account and access data associated with the user account in the media delivery system 112. User authentication information, such as a username, an email account information, a password, and other credentials, can be used for the user to log into his or her user account.

The taste profiles 242 contain records indicating media content tastes of users. A taste profile can be associated with a user and used to maintain an in-depth understanding of the music activity and preference of that user, enabling personalized recommendations, taste profiling and a wide range of social music applications. Libraries and wrappers can be accessed to create taste profiles from a media library of the user, social website activity and other specialized databases to mine music preferences.

In some embodiments, each taste profile 242 is a representation of musical activities, such as user preferences and historical information about the user's consumption of media content, and can include a wide range of information such as artist plays, song plays, skips, dates of listen by the user, songs per day, playlists, play counts, start/stop/skip data for portions of a song or album, contents of collections, user rankings, preferences, or other mentions received via a client device, or other media plays, such as websites visited, book titles, movies watched, playing activity during a movie or other presentations, ratings, or terms corresponding to the media, such as "comedy", "sexy", etc.

In addition, the taste profiles 242 can include other information. For example, the taste profiles 242 can include libraries and/or playlists of media content items associated with the user. The taste profiles 242 can also include information about the user's relationships with other users (e.g., associations between users that are stored by the media delivery system 112 or on a separate social media site).

The taste profiles 242 can be used for a number of purposes. One use of taste profiles is for creating personalized playlists (e.g., personal playlisting). An API call associated with personal playlisting can be used to return a playlist customized to a particular user. For example, the media content items listed in the created playlist are constrained to the media content items in a taste profile associated with the particular user. Another example use case is for event recommendation. A taste profile can be created, for example, for a festival that contains all the artists in the festival. Music recommendations can be constrained to artists in the taste profile. Yet another use case is for personalized recommendation, where the contents of a taste profile are used to represent an individual's taste. This API call uses a taste profile as a seed for obtaining recommendations or playlists of similar artists. Yet another example taste profile use case is referred to as bulk resolution. A bulk resolution API call is used to resolve taste profile items to pre-stored identifiers associated with a service, such as a service that provides metadata about items associated with the taste profile (e.g., song tempo for a large catalog of items). Yet another example use case for taste profiles is referred to as user-to-user recommendation. This API call is used to discover users with similar tastes by comparing the similarity of taste profile item(s) associated with users.

A taste profile 242 can represent a single user or multiple users. Conversely, a single user or entity can have multiple taste profiles 242. For example, one taste profile can be generated in connection with a user's media content play activity, whereas another separate taste profile can be generated for the same user based the user's selection of media content items and/or artists for a playlist.

Referring still to FIG. 3, the PMSA server 202 operates to provide various functionalities to the PMSA system 110. In some embodiments, the PMSA server 202 includes a personal media streaming appliance (PMSA) server application 250, a processing device 252, a memory device 254, and a network access device 256. The processing device 252, the memory device 254, and the network access device 256 may be similar to the processing device 214, the memory device 216, and the network access device 218, respectively, which have each been previously described.

In some embodiments, the PMSA server application 250 operates to interact with the PMSA system 110 and enable the PMSA system 110 to perform various functions, such as receiving a user manual input, displaying information, providing notifications, performing power management, providing location-based services, and authenticating one or more users for the PMSA system 110. The PMSA server application 250 can interact with other servers, such as the media content server 200 and the voice interaction server 204, to execute such functions.

Referring still to FIG. 3, the voice interaction server 204 operates to provide various voice-related functionalities to the PMSA system 110. In some embodiments, the voice interaction server 204 includes a command processing application 121, a processing device 272, a memory device 274, and a network access device 276. The processing device 272, the memory device 274, and the network access device 276 may be similar to the processing device 214, the memory device 216, and the network access device 218, respectively, which have each been previously described.

In some embodiments, the command processing application 121 operates to interact with the PMSA system 110 and enable the PMSA system 110 to perform various voice-related functions, such as voice feedback and voice notifications. In some embodiments, the command processing application 121 is configured to receive data (e.g., speech-to-text (STT) data) representative of a voice input received via the PMSA system 110 and process the data to determine a user command (e.g., a user request or instruction). In some embodiments, at least one of the media content server 200, the PMSA server 202, and the voice interaction server 204 may be used to perform one or more functions corresponding the determined user command.

A voice interaction server 204 may be used to recognize a voice command and perform steps to carry out the voice command. For example, a user may say "Ahoy computer, play preset one." The voice interaction server 204 is configured to receive the voice communication are process it. In some embodiments, the voice interaction server 204 is configured to receive data (e.g., speech-to-text (STT) data) representative of a voice input received via the PMSA system 110 and process the data to determine a user command (e.g., a user request or instruction). Various types of speech recognition technology may be used to convert speech to text, such as natural language understanding (NLU), automatic speech recognition (ASR), and speech to text (STT) technology.

The command processing application 121 may function similar to command processing engine 123 of the PMSA 110. In an embodiment, the command processing application 121 and command processing engine 123 work together to receive an instruction, convert it to text, and produce an outcome. In a non-limiting example, command processing application 121 performs all the functions to convert an instruction to text and sends an action to be carried out by the PMSA 110.

Figure 4:
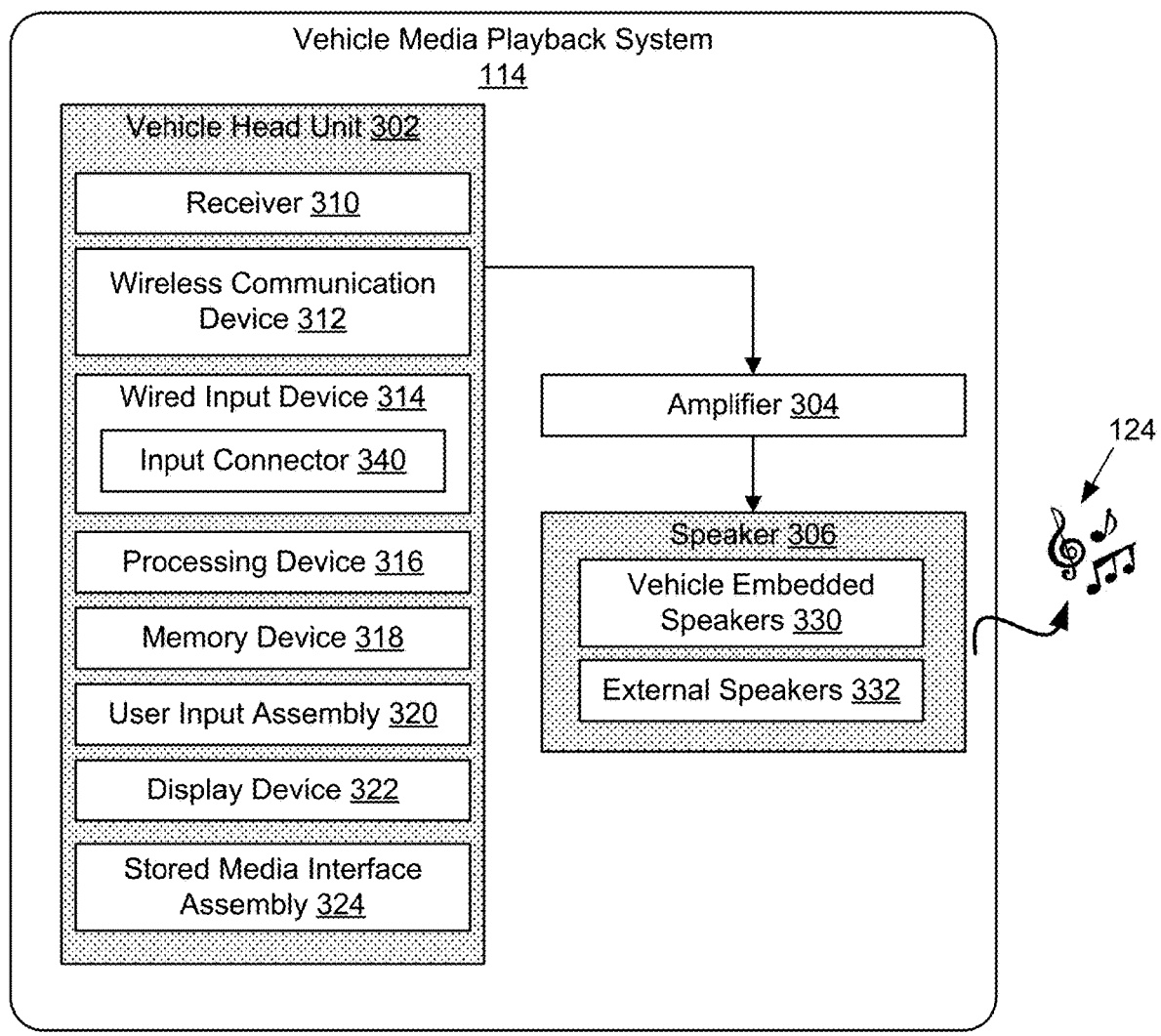
FIG. 4 is a block diagram of an example embodiment of a vehicle media playback system.

FIG. 4 is a block diagram of an example embodiment of the vehicle media playback system 114. In this example, the vehicle media playback system 114 includes a vehicle head unit 302, an amplifier 304, and a speaker 306.

The vehicle head unit 302 is configured to receive a user input and generate media content from various sources. In this example, the vehicle head unit 302 includes a receiver 310, a wireless communication device 312, a wired input device 314, a processing device 316, a memory device 318, a user input assembly 320, a display device 322, and a stored media interface assembly 324.

The receiver 310 operates to receive media content signals from various external sources. The received signals can then be used to generate media output by the vehicle media playback system 264. Some embodiments of the receiver 310 include one or more tuners for receiving radio signals such as FM or AM radio signals. Other embodiments of the receiver 310 include a receiver for receiving satellite radio signals and/or a receiver for receiving internet radio signals.

The wireless communication device 312 operates to communicate with other devices using wireless data signals. The wireless communication device 312 can include one or more of a Bluetooth® transceiver and a WiFi® transceiver. The wireless data signal may comprise a media content signal such as an audio or video signal. In some embodiments, the wireless communication device 312 is used to enable the vehicle media playback system 114 to wirelessly communicate with the PMSA system 110 and receive the media content signal 164 (FIG. 2) from the PMSA system 110 via an in-vehicle wireless network. The in-vehicle wireless network between the PMSA system 110 and the vehicle media playback system 114 can be configured similarly to the in-vehicle wireless data communication 122 (FIG. 2).

The wired input device 314 provides an interface configured to receive a cable for providing media content and/or commands. The wired input device 314 includes an input connector 340 configured to receive a plug extending from a media playback device for transmitting a signal for media content. In some embodiments, the wired input device 314 can include an auxiliary input jack (AUX) for receiving a plug from a media playback device that transmits analog audio signals. The wired input device 314 can also include different or multiple input jacks for receiving plugs from media playback devices that transmit other types of analog or digital signals (e.g., USB, HDMI, Composite Video, YPbPr, DVI). In some embodiments, the wired input device 314 is also used to receive instructions from other devices.

In some embodiments, the wired input device 314 provides the input connector 340 (e.g., an AUX port) for receiving a connector 552 extending from the PMSA system 110, as illustrated in FIG. 6. The media content signal 164 is then transmitted from the PMSA system 110 to the vehicle media playback system 114 via the cable 550, the connector 552, and the input connector 340.

The processing device 316 operates to control various devices, components, and elements of the vehicle media playback system 114. The processing device 316 can be configured similar to the processing device 148 (FIG. 2) and, therefore, the description of the processing device 316 is omitted for brevity purposes.

In some embodiments, the processing device 316 operates to process the media content signal 164 received from the PMSA system 110 and convert the signal 164 to a format readable by the vehicle media playback system 114 for playback.

The memory device 318 is configured to store data and instructions that are usable to control various devices, components, and elements of the vehicle media playback system 114. The memory device 318 can be configured similar to the memory device 150 (FIG. 2) and, therefore, the description of the memory device 318 is omitted for brevity purposes.

The user input assembly 320 includes one or more input devices for receiving user input from users for controlling the vehicle media playback system 114. In some embodiments, the user input assembly 320 includes multiple knobs, buttons, and other types of input controls for adjusting volume, selecting sources and content, and adjusting various output parameters. In some embodiments, the various input devices are disposed on or near a front surface of the vehicle head unit 302. The various input devices can also be disposed on the steering wheel of the vehicle or elsewhere. Additionally or alternatively, the user input assembly 320 can include one or more touch sensitive surfaces, which can be incorporated in the display device 322.

The display device 322 displays information. In some embodiments, the display device 322 includes a liquid crystal display (LCD) panel for displaying textual information about content and/or settings of the vehicle media playback system 114. The display device 322 can also include other types of display panels such as a light emitting diode (LED) panel. In some embodiments, the display device 322 can also display image or video content.

The stored media interface assembly 324 reads media content stored on a physical medium. In some embodiments, the stored media interface assembly 324 comprises one or more devices for reading media content from a physical medium such as a compact disc or cassette tape.

The amplifier 304 operates to amplify a signal received from the vehicle head unit 302 and transmits the amplified signal to the speaker 306. In this manner, the media output 124 can be played back at a greater volume. The amplifier 304 may include a power source to power the amplification.

The speaker 306 operates to produce an audio output (e.g., the media output 124) based on an electronic signal. The speaker 306 can include one or more vehicle embedded speakers 330 disposed at various locations within the vehicle 80. In some embodiments, separate signals are received for at least some of the speakers (e.g., to provide stereo or surround sound).

In other embodiments, the speaker 306 can include one or more external speakers 332 which are arranged within the vehicle 102. Users may bring one or more external speakers 332 into the vehicle 102 and connect the external speakers 332 to the vehicle head unit 302 using a wired interface or a wireless interface. In some embodiments, the external speakers 332 can be connected to the vehicle head unit 302 using Bluetooth®. Other wireless protocols can be used to connect the external speakers 332 to the vehicle head unit 302. In other embodiments, a wired connection (e.g., a cable) can be used to connect the external speakers 332 to the vehicle head unit 302. Examples of the wired connection include an analog or digital audio cable connection and a universal serial bus (USB) cable connection. The external speaker 332 can also include a mechanical apparatus for attachment to a structure of the vehicle.

Figure 5:
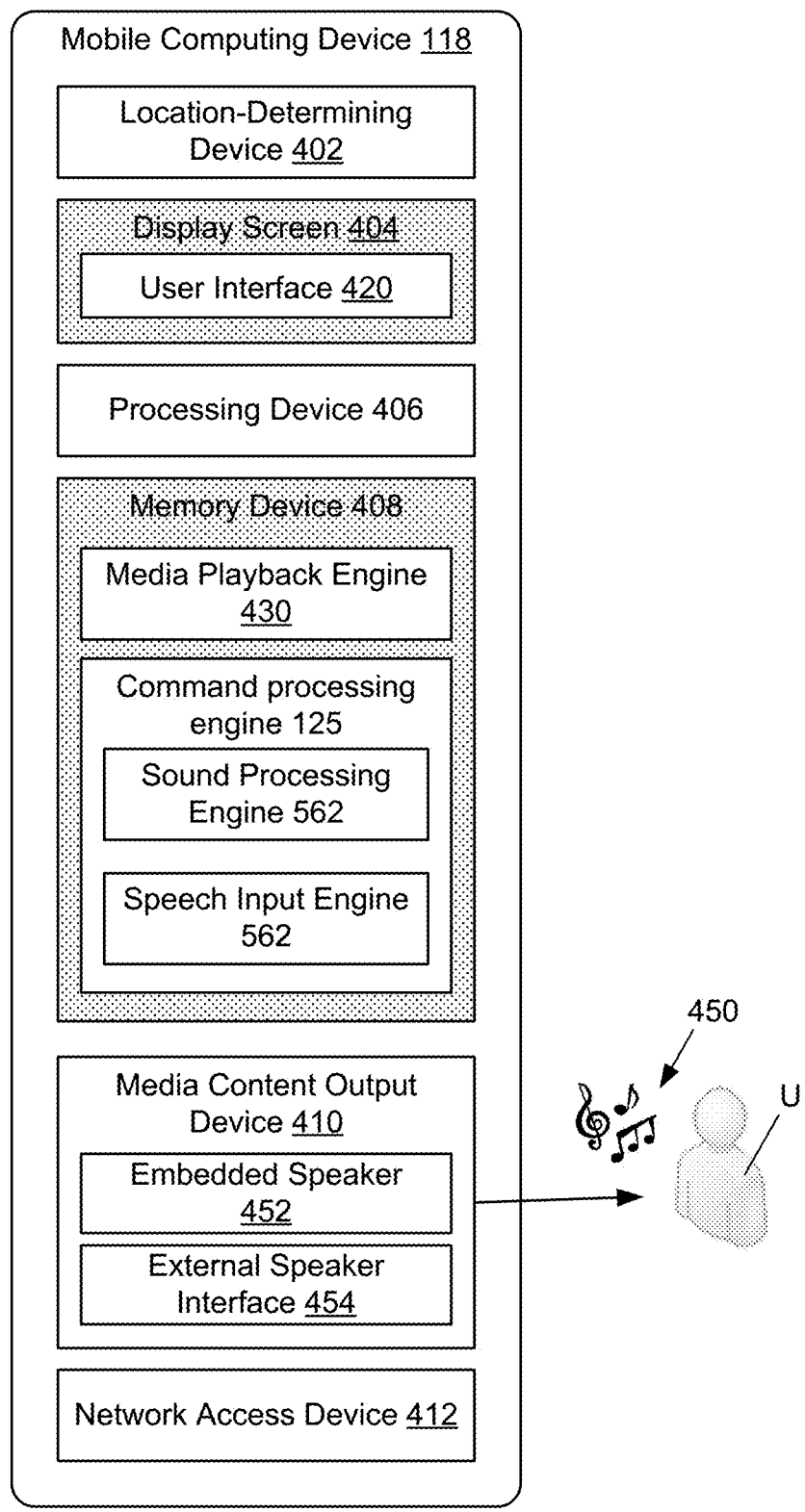
FIG. 5 is a block diagram of an example embodiment of a mobile computing device.

FIG. 5 is a block diagram of an example embodiment of the mobile computing device 118 of FIG. 1.

Similar to the PMSA system 110, the mobile computing device 118 can also be used to play media content. For example, the mobile computing device 118 is configured to play media content that is provided (e.g., streamed or transmitted) by a system external to the mobile computing device 118, such as the media delivery system 112, another system, or a peer device. In other examples, the mobile computing device 118 operates to play media content stored locally on the mobile computing device 118. In yet other examples, the mobile computing device 118 operates to play media content that is stored locally as well as media content provided by other systems.

In some embodiments, the mobile computing device 118 is a handheld or portable entertainment device, smartphone, tablet, watch, wearable device, or any other type of computing device capable of playing media content. In other embodiments, the mobile computing device 118 is a laptop computer, desktop computer, television, gaming console, set-top box, network appliance, blue-ray or DVD player, media player, stereo, or radio.

As described herein, the mobile computing device 118 is distinguished from the PMSA system 110 in various aspects. For example, unlike the PMSA system 110, the mobile computing device 118 is not limited to playing media content, but configured for a wide range of functionalities in various situations and places. The mobile computing device 118 is capable of running a plurality of different software applications for different purposes. The mobile computing device 118 enables the user to freely start or stop activation of such individual software applications.

In at least some embodiments, the mobile computing device 118 includes a location-determining device 402, a display screen 404, a processing device 406, a memory device 408, a content output device 410, and a network access device 412. Other embodiments may include additional, different, or fewer components. For example, some embodiments may include a recording device such as a microphone or camera that operates to record audio or video content.

The location-determining device 402 is a device that determines the location of the mobile computing device 118. In some embodiments, the location-determining device 402 uses one or more of Global Positioning System (GPS) technology (which may receive GPS signals), Global Navigation Satellite System (GLONASS), cellular triangulation technology, network-based location identification technology, Wi-Fi® positioning systems technology, and combinations thereof.

The display screen 404 is configured to display information. In addition, the display screen 404 is configured as a touch sensitive display and includes a user interface 420 for receiving a user input from a selector (e.g., a finger, stylus etc.) controlled by the user U. In some embodiments, therefore, the display screen 404 operates as both a display device and a user input device. The touch sensitive display screen 404 operates to detect inputs based on one or both of touches and near-touches. In some embodiments, the display screen 404 displays a graphical user interface for interacting with the mobile computing device 118. Other embodiments of the display screen 404 do not include a touch sensitive display screen. Some embodiments include a display device and one or more separate user interface devices. Further, some embodiments do not include a display device.

In some embodiments, the processing device 406 comprises one or more central processing units (CPU). In other embodiments, the processing device 406 additionally or alternatively includes one or more digital signal processors, field-programmable gate arrays, or other electronic circuits.

The memory device 408 operates to store data and instructions. In some embodiments, the memory device 408 stores instructions for a media playback engine 430. In yet other embodiments, the memory device 408 includes a command processing engine 125 that includes a sound processing engine 560 and a speech input engine 562.

The memory device 408 may be configured similarly to the memory device 150 (FIG. 2) and, therefore, the description of the memory device 408 is omitted for brevity purposes.

In some embodiments, the media playback engine 430 operates to retrieve one or more media content items that are either locally stored in the mobile computing device 118 or remotely stored in the media delivery system 114. In some embodiments, the media playback engine 430 is configured to send a request to the media delivery system 114 for media content items and receive information about such media content items for playback.

In embodiments the sound processing engine 560 is configured similarly to the sound processing engine 180 described with reference to FIG. 2, and, therefore, the description of the sound processing engine 560 is omitted for brevity purposes. It should be appreciated that in some embodiments, sound processing engine 562 is omitted, and therefore the command processing application 121 located on the media delivery system 112 functions exclusively to process an instruction. In other embodiments, as described above, command processing engine 125 works with sound processing application 121 of media delivery system 112. For example, an instruction is received by the speech input engine 562 of the mobile computing delivery 118, and the speech input application 800 of the media delivery system 112 functions analyze the instruction and provide a command back to the mobile computing device 118.

Referring still to FIG. 5, the content output device 410 operates to output media content. In some embodiments, the content output device 410 generates media output 450 for the user U. In some embodiments, the content output device 410 includes one or more embedded speakers 452, which are incorporated in the mobile computing device 118. Therefore, the mobile computing device 118 can be used as a stand-alone device that generates the media output 450.

In addition, some embodiments of the mobile computing device 118 include an external speaker interface 454 as an alternative output of media content. The external speaker interface 454 is configured to connect the mobile computing device 118 to another system having one or more speakers, such as headphones, portal speaker assemblies, and the vehicle media playback system 114, so that the media output 450 is generated via the speakers of the other system external to the mobile computing device 118. Examples of the external speaker interface 454 include an audio output jack, a Bluetooth® transmitter, a display panel, and a video output jack. Other embodiments are possible as well. For example, the external speaker interface 454 is configured to transmit a signal through the audio output jack or Bluetooth® transmitter that can be used to reproduce an audio signal by a connected or paired device such as headphones or a speaker.

The network access device 412 operates to communicate with other computing devices over one or more networks, such as the network 116 and the in-vehicle wireless data communication 122. Examples of the network access device 412 include wired network interfaces and wireless network interfaces. Wireless network interfaces includes infrared, Bluetooth® wireless technology, 802.11a/b/g/n/ac, and cellular or other radio frequency interfaces in at least some possible embodiments.

FIG. 6 schematically illustrates an example embodiment of the PMSA system 110 of FIG. 1. In this example, the PMSA system 110 includes a personal media streaming appliance (PMSA) 500 and a docking device 502.

In some embodiments, the PMSA system 110 is sized to be relatively small so that the PMSA system 110 can be easily mounted to a structure (e.g., a dashboard or head unit) of the vehicle 102 where the user can conveniently manipulate the PMSA system 110. By way of example, the PMSA system 110 is configured to be smaller than a typical mobile computing device, such as a smartphone. Further, the PMSA 500 provides a simplified user interface for controlling playback of media content. For example, the PMSA 500 has a limited set of physical control elements, such as a single rotary knob and one or more physical buttons as described below, so that the user can easily control the PMSA system 110 in the vehicle 102 (FIG. 1).

The PMSA 110 is configured to include at least some of the devices of the PMSA system 110 as illustrated with reference to FIG. 2. In some embodiments, the PMSA 500 includes all of the devices of the PMSA system 110 as illustrated in FIG. 2.

As illustrated also in FIG. 2, some embodiments of the PMSA 500 includes the user input device 130 that includes the manual input device 160 and the sound detection device 162. Some embodiments of the manual input device 160 include a control knob 510 and one or more physical buttons 512.

In some embodiments, the control knob 510 is configured to be maneuverable in multiple ways. For example, the control knob 510 provides a plurality of regions on a knob face 514 that are independently depressible upon receiving a user's pressing action against the knob face 514. In the illustrated example, the control knob 510 has five regions 516 (e.g., up, down, left, right, and middle) that are separately depressible. At least some of the regions 516 are configured to receive inputs of different user commands (e.g., requests or instructions).

In other embodiments, the control knob 510 is configured to be manipulated in different ways, such as tilting in multiple directions or sliding in multiple directions.

In addition, the control knob 510 is configured to be rotatable. For example, the user can hold the control knob 510 and rotate with respect to a body 520 of the PMSA 500. The control knob 510 can be rotatable in both directions 522 (e.g., clockwise and counterclockwise). In other embodiments, the control knob 510 is configured to rotate in only one direction.

The control knob 510 is used to receive user inputs for controlling playback of media content. In addition or alternatively, the control knob 510 can be used to receive user inputs for other purposes or functions.

The physical buttons 512 are configured to be depressed upon receiving a user's pressing action against the physical buttons 512. In the illustrated example, the PMSA 500 has four physical buttons 512A-512D. In some embodiments, each of the physical buttons 512 is configured to receive a single user command. In other embodiments, at least one of the physical buttons 512 is configured to receive multiple user commands.

The phrase "preset one" as used herein is used to refer to the media context that are associated with physical preset buttons. For example, uttering the phrase has an analogous effect as pressing the physical preset button.

In some embodiments, the physical buttons 512 are preset buttons 512. As described herein, the preset input processing engine 184 operates to receive a user input (e.g., a manual input 154) via a preset button 512 of the PMSA system 110. The preset button 512 can be configured to be actuated in various methods for receiving a user input. In some embodiments, the preset button 512 is configured as a physically depressible button. In these embodiments, the preset button 512 can be actuated by being depressed, which is caused by a pressing action using a user's finger or another body portion.

The preset input processing engine 184 can be configured to interpret and process different user actions against the preset button 512 as different user inputs. By way of example, in the embodiments where the preset button 512 is a physically depressible button, a single action of pushing and releasing the preset button 512 can be interpreted as a request for playing a media context assigned to the preset button 512 if the media context is not currently playing. If the media context is currently playing, the same single action of pushing and releasing the preset button 512 can be determined as a request for stopping (including pausing) the playback of the media context. In addition, while a media context that is not assigned to the preset button 512 is currently playing, an action of pushing the preset button 512 and holding it for a predetermined of time (e.g., 2 seconds) can be used as a request for assigning the currently-playing media context to the preset button 512. In other embodiments, other actions against the preset button 512 can be associated with the user requests above or any other user requests.

The preset buttons are "preset" to be associated with particular media context, thereby facilitating playback of such media content. In these embodiments, the physical buttons 512 are also referred to as preset buttons 512. The presets associated with the preset buttons 512 are linked to a list of IDs stored in the media delivery system 112. In an example embodiment, there are four presets that correspond to four physical buttons 512, including preset one 512a, preset two 512b, preset three 512c, and preset four 512d. In other embodiments there are more or less than four preset buttons 512. Each of preset buttons 512a-d are associated with a unique ID in the list of IDs on the media delivery system 112 (as discussed in further detail herein with reference to FIG. 13). Each preset is associated with a media context. Although it is possible that a media context would contain only a single media content item, most often a media context is associated with multiple media content items, for example at least one playlist 238. In another embodiment, the media delivery system 112 stores more than four presets, herein referred to as shortcuts. Shortcuts are analogous to presets except that shortcuts do not correspond directly to a physical button 512. Shortcuts can be assessed through a voice command or with a mobile computing device.

In addition, the PMSA 500 also includes the display device 132. In some embodiments, the display device 132 is arranged at the knob face 514 of the control knob 510. As described herein, in some embodiments, the display device 132 does not include a touch sensitive display screen, and is configured as a display device only. In other embodiments, however, the display device 132 can be configured to be touch sensitive and receive a user input through the display device 132 as well.

Referring still to FIG. 6, the docking device 502 is configured to mount the PMSA 500 to a structure of the vehicle 102. The docking device 502 is configured to removably mount the PMSA 500 thereto. The docking device 502 is further configured to attach to a structure of the vehicle 102 (FIG. 1) so that the PMSA 500 is positioned at the structure of the vehicle 102.

In some embodiments, an interface between the PMSA 500 and the docking device 502 is configured to prevent the PMSA 500 from rotating relative to the docking device 502 when the control knob 510 is manipulated by a user. For example, the docking device 502 has a portion (e.g., a front portion of the docking device 502) configured to interlock a corresponding portion of the PMSA 500 (e.g., a rear portion of the PMSA 500) when the PMSA 500 is mounted to the docking device 502 such that the portion of the docking device 502 and the corresponding portion of the PMSA 500 form the interface therebetween.

In addition or alternatively, the PMSA 500 and the docking device 502 include magnetic materials at the interface therebetween so that the PMSA 500 and the docking device 502 are magnetically coupled to each other.

In some embodiments, the docking device 502 includes one or more electrical contacts 530 that are electrically connected to corresponding electrical contacts (not shown in FIG. 6) of the PMSA 500 when the PMSA 500 is mounted to the docking device 502. Such electrical connection between the PMSA 500 and the docking device 502 is provided for various functions.

First, as described herein, the PMSA 500 does not include a battery sufficient for a prolonged use without an external power supply. In some embodiments, the PMSA 500 is primarily powered by a vehicle power supply 540. In some embodiments, the docking device 502 has a power receiving line 544 for connection to the vehicle power supply 540. For example, the power receiving line 544 extends from the docking device 502 and has a power connector 546 at a free end that is configured to mate with a vehicle power outlet 542 (e.g., a 12V auxiliary power outlet) of the vehicle power supply 540. As such, the docking device 502 receives electric power from the vehicle power supply 540 via the power receiving line 544, and the electrical connection between the PMSA 500 and the docking device 502 is configured to deliver electric power from the docking device 502 to the PMSA 500.

Second, as described herein, the PMSA 500 does not have a speaker and is designed to transmit media content signals to the vehicle media playback system 114 so that the media content is played through the vehicle media playback system 114. In some embodiments, the docking device 502 includes a media content output line 550 (also referred to herein as a media content output cable) (e.g., an auxiliary (AUX) output) configured to connect with the vehicle media playback input connector 340 (e.g., an auxiliary (AUX) port) of the vehicle media playback system 114. The docking device 502 is configured to receive media content signals from the PMSA 500 via the electrical connection between the PMSA 500 and the docking device 502, and transmit the signals to the vehicle media playback system 114 via the media content output line 550. In the illustrated embodiment, the power receiving line 544 and the media content output line 550 are combined to be a single line extending from the docking device 502 until the power connector 546, and the media content output line 550 further extends (or branches out) from the power connector 546 and terminates at a media output connector 552. The media output connector 552 is configured to connect to the vehicle media playback input connector 340 of the vehicle media playback system 114. In other embodiments, the media content output line 550 and the power receiving line 544 extend separately from the docking device 502.

In other embodiments, one or more of the power receiving line 544 and the media content output line 550 are directly connected to, and extend from, the PMSA 500 so that electric power is directly supplied to the PMSA 500 without the docking device 502 involved, and that the media content is directly transmitted to the vehicle media playback system 114 without passing through the docking device 502.

Third, the electrical connection between the PMSA 500 and the docking device 502 can be used to detect connection between the PMSA 500 and the docking device 502.

FIG. 7 is a block diagram of an example embodiment of PMSA 110 of FIG. 2. In this example, the PMSA 110 includes a command processing engine 123 that includes a speech input engine 700 and a sound processing engine 180. The speech input engine 700 includes a speech trigger activation engine 702, a speech recognition engine 704, and a speech analysis engine 706.

The speech input engine 700 functions to receive an instruction from a user and process it to produce a desired outcome. The speech input engine 700 parses an instruction from a user into three parts: a speech-analysis activation trigger portion, a command portion, and a parameter portion, examples of which are described in further detail herein with reference to FIGS. 11 and 12.

The speech trigger activation engine 702 receives the speech-analysis activation trigger portion. For illustrative purposes, "ahoy computer" is used as the speech-analysis activation trigger phrase, also referred to as a wake phrase. A wake phrase is used by the speech trigger activation engine 702 to notify the PMSA 110 to continue listening to the user or to begin listening to the user. If an instruction is made by the user, but it does not start with the predetermined wake phrase, the PMSA 110 does not listen to the user and ignores any further instructions, until the wake phrase is said. This prevents the PMSA 110 from listening when a user is not attempting to issue a command to safeguard the user's privacy at all times.

Where user data is used, it is handled according to a clearly defined user privacy policy and is only used to the extent allowed by the user. Where the data of other users is used, it is handled in an anonymized matter so the user does not learn of the details of other users generally or specifically.

In an alternative embodiment, a wake phrase is not required. Instead a user may 'unlock' or use another type of wake signal to activate the speech input engine 700. For example, a user may press a button on the PMSA 110, which has the same effect as saying a wake phrase.

After the wake phrase is processed, the speech recognition engine 704 identifies the command portion of the instruction. The command portion identifies intent of the user. For example, a user may say "ahoy computer, play preset one." The word "play" is identified as the command word, and the speech recognition engine 704 processes the request with regard to the next portion of the phrase as described below. Other command portions may include words such as "add," "skip," "delete," etc. In further embodiments, the speech recognition engine 704 may infer from an instruction, the user's intent, even if no command portion phrase is said.

The speech analysis engine 706 identifies the parameter portion of the instruction. The parameter portion identifies the portion of the instruction to which the command is applied. For example, in the phrase, "ahoy computer, play preset one," the last portion "present one" is the parameter portion. In an example, parameters may correspond to presets that are associated with preset buttons 512 on the PMSA 110; however, parameters may additionally correspond to shortcuts.

In some embodiments, presets correspond to a physical button 512 on a PMSA 110. These presets link to list of IDs stored in the media delivery system 112. In an example embodiment, there are four presets that correspond to four physical buttons 512 on the PMSA 110, which are associated with a list of IDs on the media delivery system 112. Each preset contains multiple media context, for example at least one playlist 238. In another embodiment, the cloud stores more than four presets, herein referred to as shortcuts. Shortcuts are analogous to presets except that shortcuts do not correspond to a button on the PMSA 110.

The sound processing engine 180 is described with reference to FIG. 2; therefore, for the sake of brevity the description is omitted.

FIG. 8 is a block diagram of an example embodiment of the command processing application 121 of the media delivery system 112. In this example, the command processing application 121 includes a sound processing application 810 and a speech input application 800. The speech input application 800 includes a speech trigger activation application 802, a speech recognition application 804, and a speech analysis application 806.

The speech trigger activation application 802, speech recognition application 804, and speech analysis application 806 of the command processing application 121 function similar to the speech trigger activation engine 702, a speech recognition engine 704, and a speech analysis engine 706 of the speech input engine 700 of the PMSA 110. For sake of brevity, the descriptions are omitted.

In example embodiments, the command processing engine 123 of the PMSA 110 works in conjunction with the command processing application 121 of the media delivery system 112 to convert an instruction to text and to analyze the instruction. Analogous engines/applications may only be located in a single location and therefore functions are not duplicated. Still further, each of the PMSA 110 and media delivery system 112 may both include all engines/applications.

In an example method, the speech trigger activation engine 702 of the PMSA 110 processes the wake signal, the speech recognition application 804 and speech analysis application 806 of the command processing application 121 process the command and parameter portion. In other embodiments, other combinations of the speech input engine 700 of the PMSA and the speech input application 800 of the media delivery system 112 may be utilized to process the instruction.

Sound processing application 810 functions similar to sound processing engine 180 of the PMSA 110 as described with reference to FIG. 2. For the sake of brevity, the description of the sound processing engine 180 is omitted.

Figure 9:
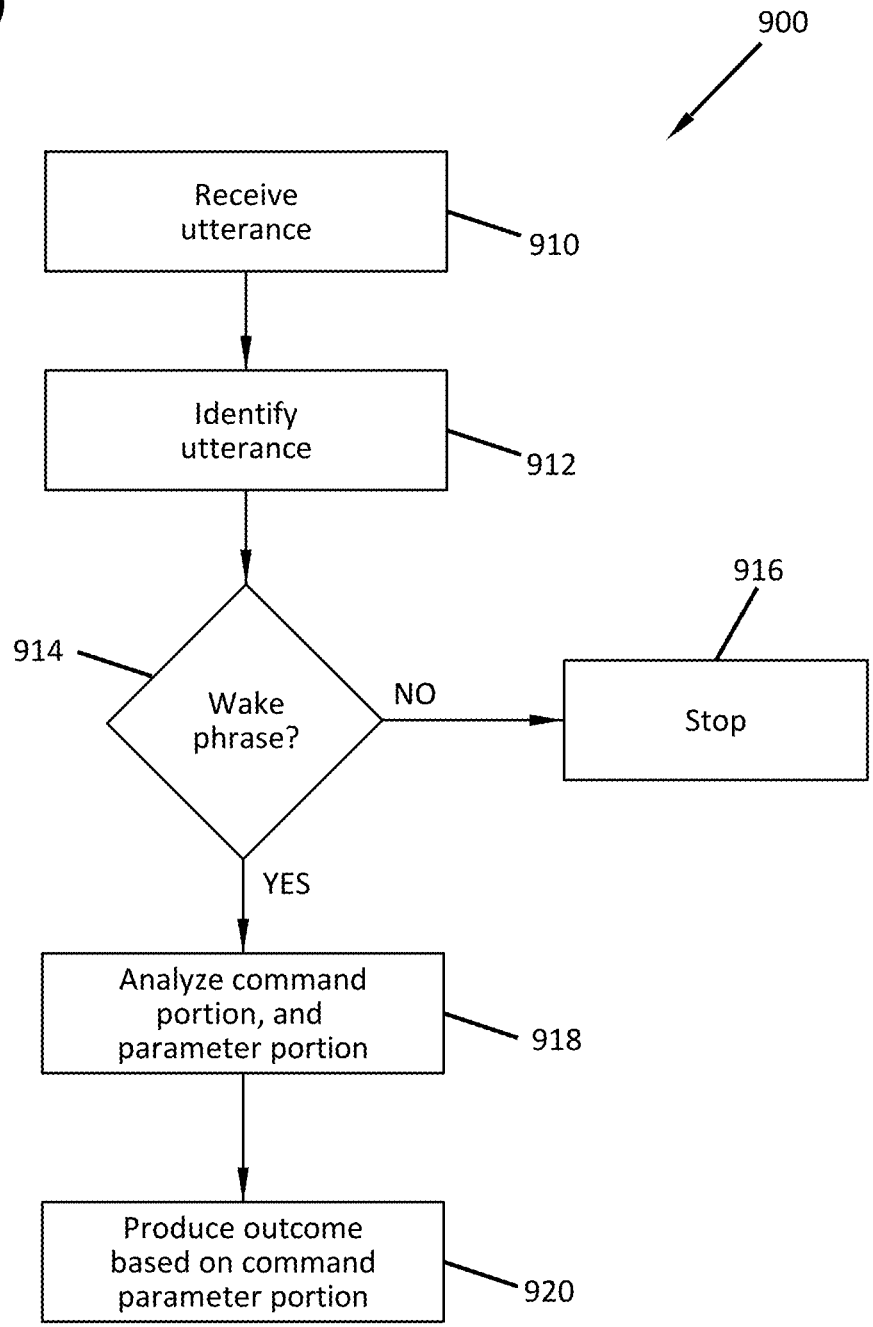
FIG. 9 schematically illustrates an example method as described herein.

FIG. 9 illustrates an example method 900 of receiving an instruction at a PMSA 110 and processing the instruction to produce a desired action. In a first step, an instruction is received 910. A user voices an instruction, which, in an example embodiment includes a wake phrase, a command portion, and a parameter portion. It should be noted, that an instruction can still be processed without including each of the wake phrase, command portion, and parameter portion. As described herein, a different wake signal may be used instead of a wake phrase, or a command portion may be inferred.

Next, the instruction is identified 912. As explained above, the instruction is parsed into three portions. If the wake phrase is identified, the PMSA 110 will continue to listen to the instruction 914. In contrast, if the wake phrase is not identified, the method stops 916 and the PMSA 110 stops listening to the instruction (or never listens to the instruction in the first place). For purposes of this illustration, the wake phrase is required to activate the PMSA 110 to continue listening to a user. It should be noted, that there are alternative embodiments that do not require a wake phrase as described above.

After the wake phrase is identified, the command portion and parameter portions are identified and analyzed 918. The speech trigger activation engine or application identifies and analyzes the wake phrase, the speech recognition engine or application analyzes the command portion, and the speech analysis engine or application analyze the parameter portion. The instruction is received and is converted from audio to text using one of a variety of methods. In an example embodiment, the instruction is converted to text by a third party server. Such a third party server may use methods such as natural language understanding, speech to text, and other similar methods to convert the audio to a text format.

Finally, the command portion is applied to the parameter portion 920. For example, if the command is "play" and the parameter is "preset one," then the PMSA 110 will begin to play preset one. If the command is "add" and the parameter is "Jon's favorites to preset two," then the media delivery system 112 (or PMSA 110) will add the playlist "Jon's favorites" to preset two.

It should be noted that the method 900 may be carried out by the command processing engine 123 of the PMSA 110, the command processing application 121 of the media delivery system 112, or both.

Figure 10:
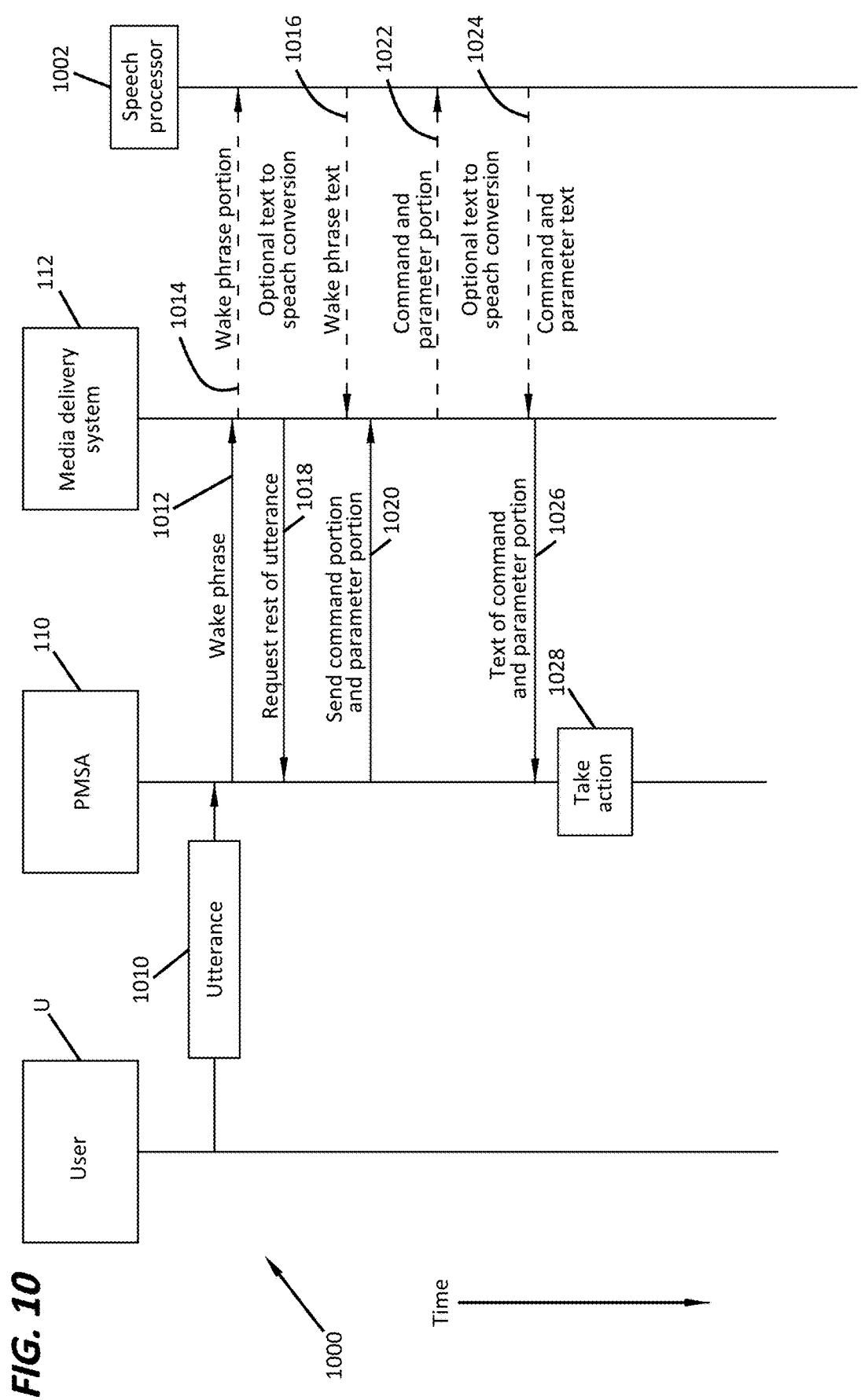
FIG. 10 schematically illustrates an embodiment of a voice to text method.

FIG. 10 illustrates a communication diagram of a method of receiving a voice command and processing it to produce a desired outcome. The system 1000 includes a user U, PMSA 110, media delivery system 112, and optional speech processor 1002. At communication 1010, a user U produces an instruction, which is received by the PMSA 1110. For purposes of this illustration, the instruction is assumed to include a proper wake phrase, a command portion, and a parameter portion. The wake portion is transmitted 1012 to the media delivery system 112 for recognition. Optionally, the wake portion is transmitted 1014 to a third party speech processor for audio to text conversion, and then the text is sent 1016 to the media delivery system 112. The media delivery system 112 sends a message to the PMSA 110 to send the rest of the instruction 1018.

The PMSA 110 sends the rest of the instruction including the command portion and parameter portion 1020 to the media delivery system 112. In an embodiment, the media delivery system 112 converts the instruction to text and sends the text of the command and parameter portion 1026 to the PMSA 110. Alternatively, the command portion and parameter portion are sent 1022 to a speech processor 1002. Then the speech processor 1002 sends a text version of the command and parameter portion 1024 to the media delivery system 112, which sends it 1026 to the PMSA 110.

In a final step, the PMSA 110 takes the action 1028 corresponding to the instruction. If the instruction was ". . . play preset one," then the PMSA 110 will begin to play media context of preset one. If the instruction was " . . . add favorite playlist to preset two," then the PMSA 110 (or media delivery system 112) will assign the media context of favorite playlist to preset two 512b (shown in FIG. 6).

The method 900 can be repeated any number of times. After the PMSA 110 takes the action 1028, the PMSA 110 is capable of receiving a second instruction. The second instruction may be an instruction to play a different preset or skip to the next media context. The second instruction may also be an instruction to add the presently playing media context to a preset or playlist. Still further, the second instruction may be an instruction to create an alias to a specified preset (or shortcut).

Figure 11:
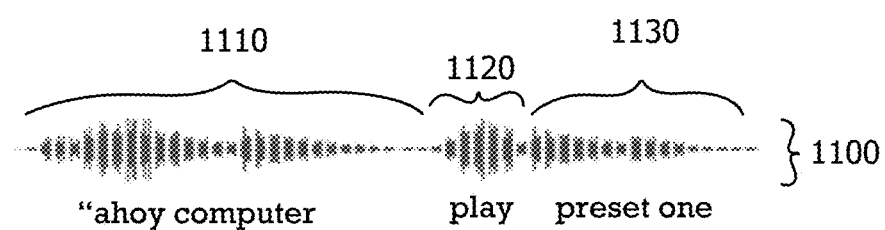
FIG. 11 schematically illustrates an example instruction.

FIG. 11 illustrates an example instruction 1100. The example instruction 1100 includes a speech-analysis activation trigger portion 1110, a command portion 1120, and a parameter portion 1130. In the illustrated example, the analysis-type activation trigger 1110 of the instruction 1100 corresponds the phrase "ahoy computer", the command portion 1120 corresponds to the phrase "play", and the parameter portion 1130 corresponds the phrase "preset one".

The PMSA 110 receives the instruction 1100. Responsive to the speech trigger activation engine 702 detecting the wake phrase 1110, the speech trigger activation engine 702 provides at least a portion of the instruction 1100 to the speech recognition engine 704 and speech analysis engine 706. The speech input engine 700 processes some or all of the instruction 1100 and identifies one or more of the various portions 1110, 1120, 1130. Identifying the portions is performed using a variety of techniques. According to one technique, the instruction 1100 is segmented into constituent portions based on the text content of the instruction 1100. According another technique, the instruction 1100 is segmented based on how the instruction 1100 was uttered (e.g., splitting the instruction based on pauses, phonemes, syllables, or other aspects of the instruction), among other techniques. Where the speech trigger activation engine 702 determines that the instruction 1100 includes the command portion 1120, the speech recognition engine 704 determines a command associated with the command portion 1120 (e.g., using natural language processing, look-up tables, or other techniques).

The speech analysis engine 706 also determines whether the instruction 1100 includes a parameter portion 1130. The determined command is then executed using the one or more parameters in the parameter portion 1130. Based on the desired action of the executed command, the PMSA 110 generates an action, including a response or confirmation for the user. The action varies depending on specifics of the command and how it is executed. In some instances, the action is an effect. For instance, execution of a next-track command can have the effect of causing playback to advance to a next song in a currently-playing context.

Figure 12:
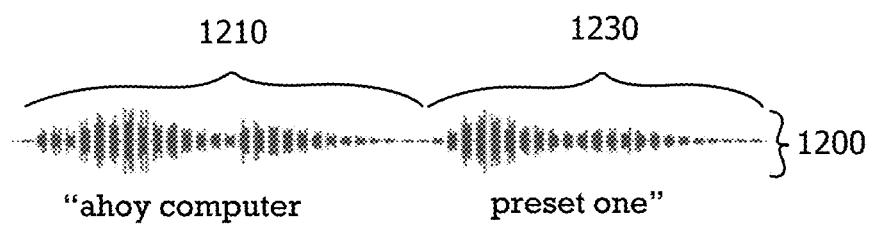
FIG. 12 schematically illustrates another example instruction.

FIG. 12 illustrates an instruction 1200 having an analysis-type activation trigger 1210 and a parameter portion 1230 and having an inferred command portion. The instruction 1200 includes the phrase "ahoy computer preset one", with the analysis-type activation trigger 1210 including "ahoy computer" and the parameter portion 1230 including "preset one".

Examples of instruction-based user interfaces include interfaces configured to process an entire instruction as an activation trigger portion, even if such an instruction would normally be processed as an instruction having multiple portions. For example, as will be described in relation to FIG. 12, a device will process the instruction "ahoy computer preset one" differently depending on how the devices is configured. In FIG. 11, "ahoy computer preset one" is processed as having an analysis-type activation trigger 1210 and a parameter portion 330. In FIG. 12, the entire phrase "ahoy computer preset one" is processed as containing a command-type activation trigger.

The usage of an activation trigger provides further advantages beyond improved processing time. Increased activation trigger length reduces the risk of accidental triggering of the instruction-based user interface. Having the activation trigger engine 702 configured to recognize command patterns constructed as the combination of an activation trigger and a command reduces false positives by requiring matching of a longer pattern (e.g., activation trigger+command) compared to the activation trigger alone.

In some examples, a command-type activation trigger is constructed from a shortened analysis-type activation trigger (e.g., "computer" rather than "ahoy computer"). This shortening provides several advantages. First, shortening improves the ability of the user to interact with the user interface by shortening the instruction length required to achieve a desired result. Second, shortening reduces the number of false activations of the speech analysis engine.

As an example of how shortening the command-type activation trigger can reduce false activations, consider a device configured to process the instruction "ahoy computer" as an analysis-type activation trigger and the phrase "ahoy computer pause" as a command-type activation trigger that causes execution of a pause playback command. When processing the instruction "ahoy computer pause", the device will trigger off of both the command-type activation trigger and the analysis-type activation trigger. This is because by the time the first part of the instruction ("Ahoy computer . . . ") is received by the PMSA 110, the speech trigger activation engine 702 likely detected that activation trigger and activated the speech recognition engine 704 and speech analysis engine 706.

Figure 13:
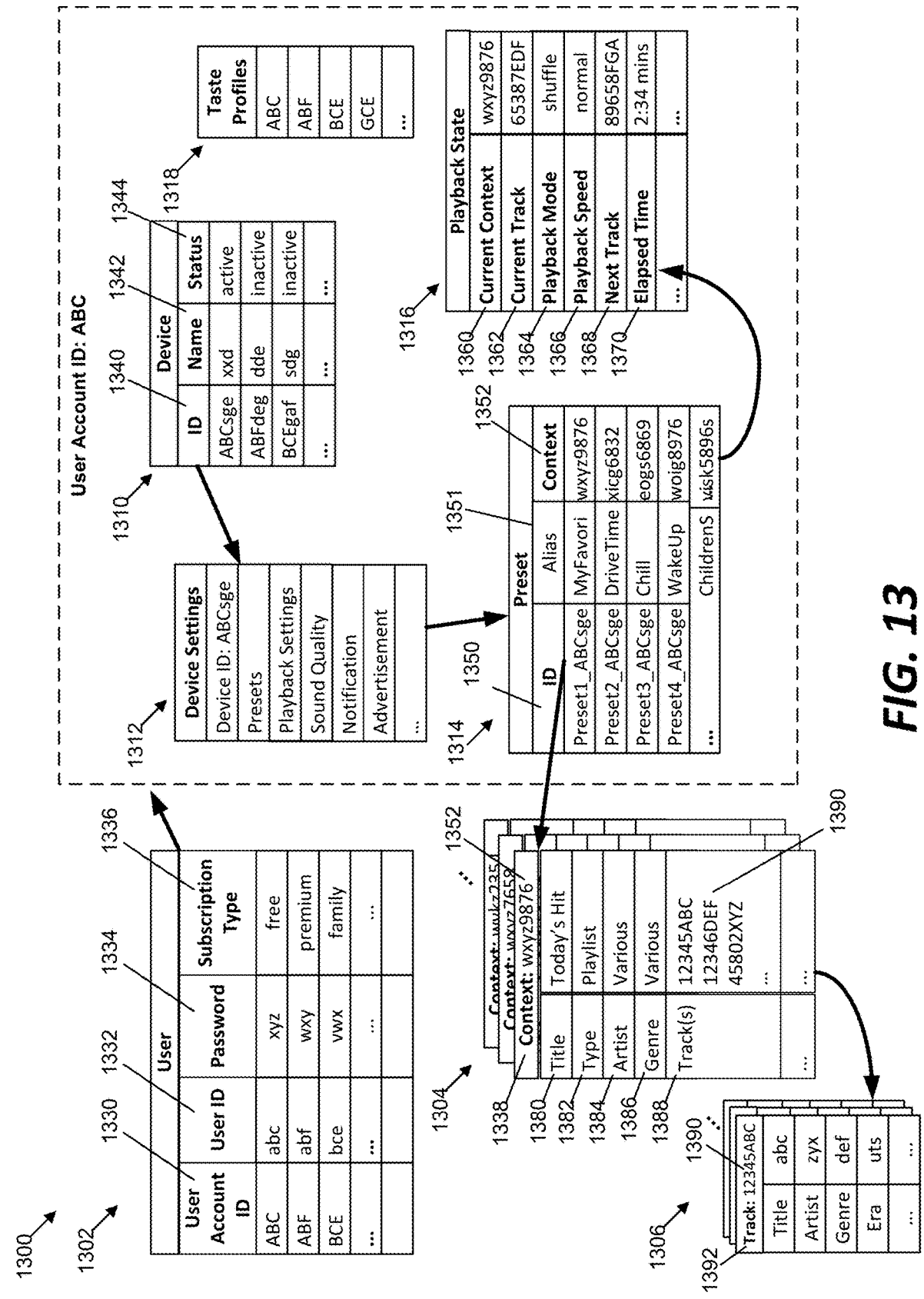
FIG. 13 illustrates an example embodiment of a data structure.

FIG. 13 illustrates an example data structure that may appear in a database of the media delivery system 112. In this embodiment, the data in the media delivery system 112 may be represented with a plurality of tables which identifies a rational nature of the database according to the embodiment of the present disclosure. However, in alternative embodiments, the data stored in the media delivery system 112 may also be implemented using other database models.

In the illustrated example, the data structure 1300 includes a user account table 1302, a media context table 1304, and a media content item table 1306. For each user account, the data structure 1300 includes a device data table 1310, a device setting table 1312, a preset table 1314, a playback state table 13113, and a taste profile table 1318.

The user account table 1302 can be configured to include data usable to identify users of the media delivery system 112 (e.g., a media content provider or a media streaming service). In some embodiments, the user account table 1302 can be used to store and identify the user accounts 240 as described with reference to FIG. 3. In some embodiments, the user account table 1302 can reference one or more other tables, and/or be referenced by one or more other tables. Some embodiments of the user account table 1302 can contain a field for user account identifiers (IDs) 1330, a field for user identifiers (IDs) 1332, a field for passwords 1334, and a field for subscription types 13313. The user account ID field identifies a plurality of user account IDs 1330 associated with the users of the media delivery system 112. The user ID field identifies user IDs 1332 associated with the user accounts. The user IDs 1332 include names or other identification information that the users can use to identify themselves in the service provided by the media delivery system 112. The user IDs 1332 can be set up by the users or automatically assigned to the users. The password field identifies passwords 1334 associated with the user accounts. The subscription type field identifies subscription types 13313 associated with the user accounts. Examples of the subscription types 133 include a free subscription and a fee-based subscription with a single tier or with multiple tiers. Such a fee-based subscription can provide services that the free subscription does not provide.

In other embodiments, the user account table 1302 can contain additional fields for other information about user, such as biographical information (e.g., address, contact information, age, gender, birth date/year, family, relationships, work, education, etc.). It is noted that, where user data is used, it can be handled according to a defined user privacy policy and can be used to the extent allowed by the user. Where the data of other users is used, it can be handled in an anonymized matter so the user does not learn of the details of other users generally or specifically.

Referring still to FIG. 13, each user account that can be identified in the user account table 1302 is associated with, and identifies, a set of data for providing various services from the media delivery system 112. In some embodiments, such a set of data includes a device data table 1310, a device setting table 1312, a preset table 1314, a playback state table 1316, and a taste profile table 1318. In the illustrated example, the tables 1310, 1312, 1314, 13113, and 1318 are primarily described to be associated with a single user account (e.g., User Account ID: ABC). However, it is understood that, in other embodiments, the tables 1310, 1312, 1314, 13113, and 1318 can be structured to be associated with a plurality of user accounts The device data table 1310 identifies one or more devices associated with a particular user account (e.g., User Account ID: ABC in FIG. 13). In some embodiments, the device data table 1310 can be referenced by the user account table 1302. Other tables can reference the device data table 1310. The device data table 1310 can also reference one or more other tables. The device data table 1310 can contain a field for device identifiers (IDs) 1340, a field for device names 1342, and a field for device status 1344. The device ID field includes one or more device IDs 1340 of one or more media playback devices 104 that are associated with the particular user account.

In some embodiments, a plurality of media playback devices 104, such as the PMSA 110, the mobile computing device 118, and other computing devices, can be respectively used to access media content service from the media delivery system 112, which is associated with a single user account. For example, a user can use different media playback devices 104, such as the PMSA 110 and the mobile computing device 118, to log in to media content service with the user's user account information, and the media content service associated with the user account can be provided to one or more of the media playback devices 104 through which the user has logged in to the user account.

The device name field includes one or more device names 1342 associated with the device IDs 1340. The device status field identifies a device status 1344 for each of the media playback devices 104 identified in the device data table 1310. In some embodiments, the device status can be either active or inactive. When the device status of a media playback device 104 is active, the media playback device 104 is in operation and accessible by the media delivery system 112 via the network 1113. When the device status of a media playback device 104 is inactive, the media playback device 104 is not in operation and thus inaccessible by the media delivery system 112 via the network 1113.

The device setting table 1312 includes information about settings that are configurable in one or more particular media playback devices. In some embodiments, the device setting table 1312 can be referenced by the device data table 1310. Other tables can reference the device setting table 1312. The device setting table 1312 can reference one or more other tables. In the illustrated example, the device setting table 1312 indicates that the media playback device identified by the device ID ("ABCsge") has various settings, such as presets, playback settings, sound quality, notification, advertisement, and other user-configurable settings.

The preset table 1314 includes information about presets associated with one or more particular media playback devices 104. In some embodiments, the preset table 1314 can be referenced by the device setting table 1312. Other tables can also reference the preset table 1314. The preset table 1314 can reference one or more other tables. In the illustrated example, the preset table 1314 contains information about the presets provided in the media playback device identified by the device ID ("ABCsge").

Some embodiments of the preset table 1314 include a field for preset identifiers (IDs) 1350, a field for preset alias (Alias) 1351, and a field for media context identifiers (IDs) 1352. The preset ID field contains one or more preset identifiers (IDs) 1350 that identify presets provided in the particular media playback device 104. The Alias field contains one or more aliases 1351 that identifies shortcuts provided in the particular media playback device 104. The context ID field contains one or more media context identifiers 1352 associated with the preset identifiers 1350, respectively. The media context identifiers 1352 are used to identify media contexts 238, as described herein.

In the illustrated examples of FIG. 13, the PMSA 110 includes the preset buttons 512, and the preset buttons 512 can be identified by the preset identifiers 1350. As the preset identifiers 1350 are associated with the media context identifiers 1352 that identify media contexts, the preset buttons 512 in the PMSA 110 can be used to retrieve the media contexts identified by the media context identifiers 1352.

The preset table 1314 also includes aliases 1351 that can be associated with a preset identifier 1350 that are associated with a preset button 512. In an example embodiment, more aliases 1351 are listed in the preset table 1314 than there are preset identifiers 1350. While the first four aliases 1351 correspond to the first four preset identifiers 1350, there may be more aliases 1351 that do not correspond to a preset identifier 1350, which do not correspond to a preset button 512. The aliases 1351 may be referred to herein also as shortcuts.

The playback state table 1316 includes information about playback of one or more media contexts 238. In some embodiments, where a plurality of media playback devices 104 may be used to play media content associated with a particular user account, only one of the plurality of media playback devices 104 can be used to play the media content while the other media playback devices 104 may not be used to play the same media content simultaneously. In these embodiments, the playback state table 1316 is configured to indicate playback information that is in common among the plurality of media playback devices associated with the particular user account. In other embodiments, the playback state table 1316 is configured to indicate playback information for each of the media playback devices associated with the particular user account, where the media playback devices may be used independently to play media content in different manners.

In some embodiments, the playback state table 1316 contains a current context 1360, a current media content item (i.e., a current track) 1362, a playback mode 1364, a playback speed 1366, and a next media content item (i.e., a next track) 1368. In addition or alternatively, the playback state table 1316 can contain other playback-related information. In some embodiments, the playback state table 1316 can reference one or more other tables, and/or be referenced by one or more other tables. The current context 1360 indicates a media context 238 that is being currently played in a media playback device 104. The current media content item 1362 indicates a media content item that is being currently played from the current context 1360. The playback mode 1364 indicates a playback mode that is currently selected. Examples of the playback mode include a normal playback mode, a repeat playback mode, and a shuffle playback mode. The playback speed 1366 indicates a playback speed that is currently selected. Examples of the playback speed include a normal playback speed, one or more faster playback speeds, and one or more slower playback speeds. The next media content item 1368 indicates a media content item that is in queue and will be subsequently played after the current media content item 1362.

Referring still to FIG. 13, the taste profile table 1318 is configured to identify a taste profile 242 (FIG. 3) associated with the particular user account. In some embodiments, the taste profile table 1318 can be referenced by the user account table 1302. Other tables can reference the taste profile table 1318. The taste profile table 1318 can also reference one or more other tables.

With reference still to FIG. 13, the media context table 1304 is configured to identify one or more media contexts 238 as described with reference to FIG. 3. As illustrated, some embodiments of the media context table 1304 can respectively identify a media context 238 by a media context identifier 1352. The media context table 1304 contains various pieces of information about a corresponding media context 238. Examples of such information include a media context title 1380, a media context type 1382, a media context artist 1384, a media context genre 1386, and a list of media content items 1388 associated with the media context 238. Other information can also be included in the media context table 1304.

The media context title 1380 indicates a title of the media context 238. The media context type 1382 indicates a type of the media context 238, such as a playlist, an album, an artist, and a track. The media context artist 1384 indicates one or more artists associated with the media context 238. The media context genre 13813 indicates a genre associated with the media context 238. The list of media content items 1388 indicates one or more media content items (i.e., tracks) associated with the media context 238. Each of the media content items can be identified by a track identifier 1390. In some embodiments, one or more of the media content items 234, as described with reference to FIG. 3, are identified by the list of media content items 1388.

The media content item table 1306 is configured to identify one or more media content items (i.e., tracks) 1392 by the track identifiers 1390. In some embodiments, one or more of the media content items 1392 are selected from the media content items 234 as described with reference to FIG. 3. The media content item table 1306 can further include various attributes about the media content item 1392, such as a media content item title, artist identification (e.g., individual artist name or group name, or multiple artist names or group names), genre, era, and other attributes of the media content item.

Because the preset data is stored in the cloud, when a preset button is activated on the PMSA 110, the PMSA only needs to send minimal data (e.g., user ID, device ID, and preset button ID) to the backend. Then, the backend identifies the media context (e.g., song, playlist, album, etc.) tied to the particular preset button 512, and transmits the media content to the media playback device.

Such a system and method provides many advantages in the computing field. For example, the PMSA 110 only sends identifying information to the backend until the media content item is actually being played. Therefore, the media content items are not downloaded or streamed until actually needed.

Other advantages allow users to communicate with the PMSA 110 using only his/her voice. This allows users to actuate the PMSA 110 without having to look at the device. This is useful for users in a car, where viewing the playback device is not desirable or lawful. Other example may include when a user is running and the playback device is located in a pocket and it is not optimal to have to remove the device and look at it to change the media context item.

Figure 14:
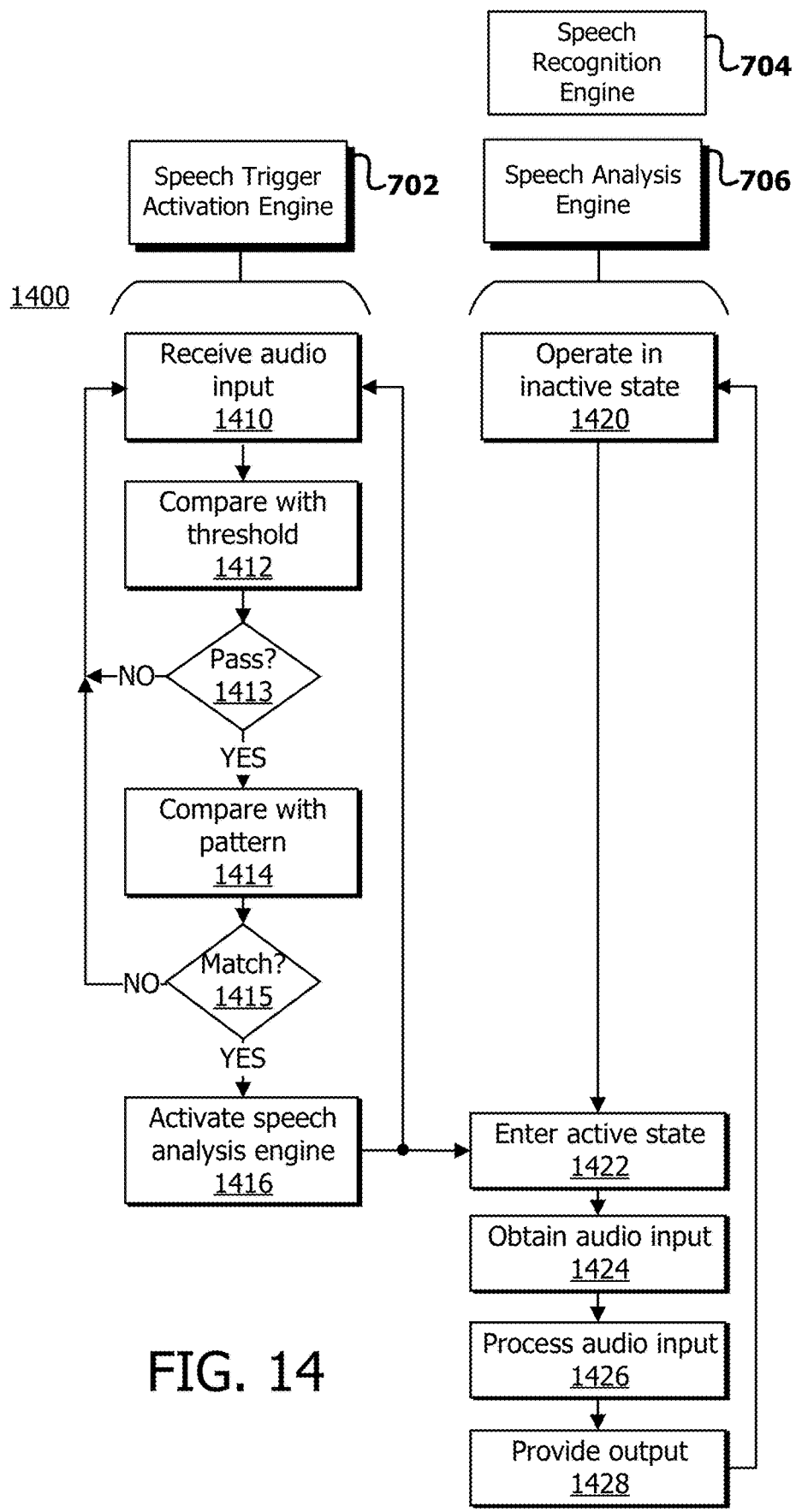
FIG. 14 is a block diagram of a method of processing an instruction.

FIG. 14 illustrates an example process 1400 for providing an instruction-based user interface without activation trigger overloading. In this process, the instruction-based user interface processes all activation triggers as being analysis-type activation triggers.

The process 1400 begins at operation 1410, at which the speech trigger activation engine 702 receives audio input. In an example, the speech trigger activation engine 702 receives audio input via a microphone of the PMSA 110 or a connection to an external audio source (e.g., a Bluetooth® connection to a device that has a microphone). The PMSA 110 is able to receive the audio input in a variety of ways. In some instances, the audio input is streaming audio input received from a stream. In some instances, the audio input includes discrete slices of audio samples or chunked input. As will be understood, various portions of process 1400 can occur simultaneously and various buffers or caches are usable to facilitate the comparison of data over time.

In operation 1412, the audio input is compared with a threshold. In an example, the volume of the audio input is compared with a threshold decibel value. In another example, the volume of certain frequencies (e.g., frequencies in a range associated with human speech) is compared to a threshold decibel value.

In operation 1413, if the audio input satisfies the threshold, then the flow moves to operation 1414. Otherwise the flow returns to operation 1410. This threshold testing process is relevant to reducing false positives and conserving computing resources by limiting processing by the speech trigger activation engine 702 to audio input likely to contain an instruction.

In operation 1414, the speech trigger activation engine 702 compares the audio input with one or more patterns to determine if the audio input includes an activation trigger. The obtained audio input can include instructions that are directed to the PMSA 110, instructions directed to another target (e.g., another person in the room), ambient room noise, or other sounds. A variety of different techniques are usable to determine if the audio input includes an activation trigger.

In one example, features are extracted from the audio input and provided to a machine learning framework configured to determine the likelihood that the extracted features correspond to an activation trigger. Audio data, in general, and human speech data, in particular, contain large amounts of extractable data features.

At operation 1415, if the received audio input matches the pattern in operation 1414, then the flow of the process 1400 moves to operation 1416. If the received audio input does not match the pattern, then the flow of the process moves back to operation 1410. In an example, the audio input matches the pattern if a difference between the features of the audio input and the pattern satisfies a threshold.

At operation 1416, the speech trigger activation engine 702 causes the speech recognition engine 704 and speech analysis engine 706 to be activated. For instance, previously the speech recognition engine 704 and speech analysis engine 706 were operating in an inactive state in operation 1420. The inactive state can take a variety of different forms. In some instances, the speech trigger activation engine 702 includes a resource-intensive process for analyzing speech input and while the speech recognition engine 704 and speech analysis engine 706 are operating in the inactive state (operation 1420), the process is not running. In another example, the speech recognition engine 704 and speech analysis engine 706 are configured to perform analysis on data within a queue and the speech recognition engine 704 and speech analysis engine 706 idle when that queue is empty. In still other examples, the speech recognition engine 704 and speech analysis engine 706 operate in an inactive state with respect to the speech trigger activation engine 702. For instance, where the speech recognition engine 704 and speech analysis engine 706 are located remote from the speech trigger activation engine 702 (e.g., at a server), the speech recognition engine 704 and speech analysis engine 706 can perform operations for devices other than PMSA 110. In other examples, the speech recognition engine 704 and speech analysis engine 706 do not operate at all when it is in the inactive state (e.g., they do not exist as a process while "operating" in the inactive state).

Returning to operation 1416, the speech trigger activation engine 702 is able to activate the speech recognition engine 704 and speech analysis engine 706 in a variety of ways. In an various examples, the speech trigger activation engine 702 sends a signal to the speech recognition engine 704 and speech analysis engine 706, the speech trigger activation engine 702 executes a command, the speech trigger activation engine 702 accesses an application programming interface associated with the speech recognition engine 704 and speech analysis engine 706, the speech trigger activation engine 702 populates a queue with data, or the speech trigger activation engine 702 pipes the output of a recording device or process to the speech recognition engine 704 and speech analysis engine 706, among other techniques. Following the completion of this operation 1416, the speech trigger activation engine 702returns to receiving audio input.

At operation 1422, the speech recognition engine 704 and speech analysis engine 706 enters an active state. This operation 1422 takes a variety of different forms depending on the implementation of speech recognition engine 704 and speech analysis engine 706. In general, however, entering the active state involves the speech recognition engine 704 and speech analysis engine 706 analyzing input data or preparing to analyze input data, such as is described in operations 1424, 1426 and 1428.

In operation 1424, the speech recognition engine 704 and speech analysis engine 706 obtains at least some of the audio input data. In some instances, the audio input is "raw" audio data. In other instances, the audio input data includes the features extracted from the audio. In an example, the speech trigger activation engine 702 buffers the audio input data obtained and, when the audio input data is determined to match an activation trigger pattern, the contents of the buffer (or a pointer to the buffer) are provided to the speech recognition engine 704 and speech analysis engine 706 for analysis. In such instances, the audio input obtained in operation 1424 includes the activation trigger portion (e.g., activation trigger portion 1110 as in instruction 302 of FIG. 11) in addition to other portions that the speech analysis engine processes (e.g., the command portion and parameter portion). Once the audio input data is provided to the speech recognition engine 704 and speech analysis engine 706 or a threshold amount of time passes, the buffer is cleared.

In some instances, the speech trigger activation engine 702 provides or redirects audio obtained after detection of the activation trigger to the speech recognition engine 704 and speech analysis engine 706. In such instances, the speech recognition engine 704 and speech analysis engine 706 obtains audio input data for a portion of an instruction following the activation trigger portion and not the activation trigger portion itself.

After receiving at least a portion of the audio input, the speech recognition engine 704 and speech analysis engine 706 can perform operation 1426, which involves processing the audio input data. Processing audio input data can take a variety of different forms. In many examples, processing audio input involves performing speech-to-text transcription of the audio input. In other examples, processing audio input can involve determining an intent associated with the instruction. For instance, if the speech recognition engine 704 and speech analysis engine 706 were processing the instruction 1100 as audio input, the speech recognition engine 704 and speech analysis engine 706 could perform speech-to-text transcription on the instruction 1100 to determine that the audio input data corresponds to the text "ahoy computer preset one". In other instances, the speech recognition engine 704 and speech analysis engine 706 can process the instruction 11002 to determine that intent behind the instruction is to cause playback from a context associated with a first preset.

At operation 1428, the speech recognition engine 704 and speech analysis engine 706 provides action based on the processing in operation 1426. As will be understood, the action is based on the type of processing performed. In some examples, the action includes the speech analysis engine causing execution of a particular command. For instance, the speech recognition engine 704 and speech analysis engine 706 determines that the user's intent is to access personalized services on the PMSA 110. (e.g., the user said "ahoy computer log me in"), and the process 1400 provides an action indicating that a login command should be executed. In some examples, the action is processed audio data (e.g., speech-to-text data and intent data) that is provided to another analysis or processing engine for further processing.

The process of providing audio input to the speech recognition engine 704 and speech analysis engine 706 for processing can introduce delays. For example, the time the PMSA 110 takes to provide the audio data for processing and wait for the action to be provided can introduce latency in the voice-based user interface. While in some instances, the performance of the speech recognition engine 704 and speech analysis engine 706 outweighs drawbacks associated with introduced latency, in some instances activation trigger overloading is relevant to decreasing both latency and resource consumption in instruction-based user interfaces.

The steps of FIG. 14 may also be preformed by the speech trigger activation application 802, speech recognition application 804, and speech analysis application 806 of the media delivery system 112.

Various operations and processes described herein can be performed by the cooperation of two or more devices, systems, processes, or combinations thereof.

While various example embodiments of the present invention have been described above, it should be understood that they have been presented by way of example, and not limitation. It will be apparent to persons skilled in the relevant art(s) that various changes in form and detail can be made therein. Thus, the present invention should not be limited by any of the above described example embodiments, but should be defined only in accordance with the following claims and their equivalents. Further, the Abstract is not intended to be limiting as to the scope of the example embodiments presented herein in any way. It is also to be understood that the procedures recited in the claims need not be performed in the order presented.

What is claimed is:

1. A method for playing media via a voice command using a media playback device having at least one physical button, the method comprising:

automatically associating the media playback device with a user account, wherein the user account associates a media context to a preset identifier associated with a first physical button of the media playback device;

receiving an audio clip of an instruction at the media playback device, the instruction comprising an activation trigger portion, a command portion, and a parameter portion, the activation trigger portion identifying a wake signal, the command portion identifying intent information, and a parameter portion identifying a preset identification information associated with the at least one physical button of the media playback device;

identifying the instruction by converting the audio clip to a text format and determining the intent information and the preset identification information from the text format;

identifying the media context associated with the preset based on the preset identification information; and transmitting the media context to the media playback device for playback.

2. The method according to claim 1, further comprising:
prior to identifying the media context,
- transmitting the preset command to the media playback device; and
- receiving a preset signal from the preset signal source of the media playback device,
- wherein the media context is identified based on the received preset signal.

3. The method according to claim 1, further comprising:
- upon playing the media context using the media playback device, obtaining a second audio clip of a second instruction representative of a save preset command from the media playback device, the save preset command having second preset identification information and second command intent information, the second preset identification information identifying a second preset signal source of the media playback device, and the second command intent information including a request for preset storage;
- identifying the save preset command by converting the second audio clip to a second text format and determining the second preset identification information and the second command intent information from the second text format;
- associating the media context with the second preset signal source of the media playback device.

4. The method according to claim 3, wherein the second preset identification information of the save preset command includes a preset number predetermined for the second preset signal source.

5. The method according to claim 3, wherein the second preset identification information of the save preset command includes a set of one or more words given by a user who provides the second instruction.

6. The method according to claim 3, wherein the second preset identification information of the save preset command includes a set of one or more words automatically generated by at least one computing device.

7. The method according to claim 1, wherein when the instruction does not comprise the wake signal, the command portion, and the parameter portion are not converted to a text format.

8. A method of assigning a media context to a preset signal source of a media playback device having at least one physical button via a voice command, the method comprising:
- associating the media playback device with a user account, wherein the user account associates a media context to a preset identifier associated with a first physical button of the media playback device;
- transmitting a media context item to the media playback device for playback;
- upon playing the media context item using the media playback device, obtaining an audio clip of an instruction representative of a save preset command from the media playback device, the save preset command having preset identification information and command intent information, the preset identification information identifying the preset signal source of the media playback device, and the command intent information including a request to associate media context with the at least one physical button;
- identifying the save preset command by converting the audio clip to a text format and determining the preset identification information and the command intent information from the text format; and
- associating the media context with the preset signal source of the media playback device.

9. The method according to claim 8, wherein the preset identification information of the save preset command includes a preset number predetermined for the second preset signal source.

10. The method according to claim 8, wherein the preset identification information of the save preset command includes a set of one or more words given by a user who provides the instruction.

11. The method according to claim 8, wherein the preset identification information of the save preset command includes a set of one or more words automatically generated by at least one computing device.

12. The method according to claim 8, wherein the instruction further comprises an activation trigger portion, the activation trigger portion identifying a wake phrase.

13. The method according to claim 12, wherein when the instruction does not comprise the wake signal, the save preset command is not converted to a text format.

* * * * *